United States Patent
Griffiths-Harvey et al.

(10) Patent No.: US 9,013,266 B2
(45) Date of Patent: Apr. 21, 2015

(54) AUTHENTICATED RADIO FREQUENCY IDENTIFICATION AND KEY DISTRIBUTION SYSTEM THEREFOR

(75) Inventors: Michael Griffiths-Harvey, Richmond Hill (CA); Brian Neill, Burlington (CA); Keelan Smith, Toronto (CA); Tony Rosati, Ottawa (CA); Walt Davis, Rogersville, MO (US)

(73) Assignee: Certicom Corp., Mississauga, Ontario (CA)

( * ) Notice: Subject to any disclaimer, the term of this patent is extended or adjusted under 35 U.S.C. 154(b) by 1014 days.

(21) Appl. No.: 11/898,181

(22) Filed: Sep. 10, 2007

(65) Prior Publication Data
US 2008/0164976 A1    Jul. 10, 2008

Related U.S. Application Data

(60) Provisional application No. 60/824,921, filed on Sep. 8, 2006, provisional application No. 60/865,566, filed on Nov. 13, 2006, provisional application No. 60/929,816, filed on Jul. 13, 2007.

(51) Int. Cl.
  *G05B 19/00* (2006.01)
  *H04L 9/30* (2006.01)
  *H04L 9/32* (2006.01)
(52) U.S. Cl.
  CPC ............ *H04L 9/3066* (2013.01); *H04L 9/3252* (2013.01); *H04L 2209/805* (2013.01)
(58) Field of Classification Search
  CPC . H04L 2209/805; H04W 12/06; G06F 21/31; G06F 21/35; G06K 19/07309

USPC ......... 340/5.2, 5.61, 5.26, 10.1, 10.51, 572.1, 340/572.4, 572.7; 713/171, 176
  See application file for complete search history.

(56) References Cited

U.S. PATENT DOCUMENTS 6,088,798 A    7/2000  Shimbo
6,738,903 B1 *  5/2004  Haines ........................ 713/168
(Continued)

FOREIGN PATENT DOCUMENTS

EP    1083700 A2    3/2001
JP    10-153956    6/1998
(Continued)

OTHER PUBLICATIONS

Pearson, J.; "Securing the Pharmaceutical Supply Chain with RFID and Public-Key Infrastructure (PKI) Technologies"; Texas Instruments Radio Frequency Identification (TI-FRid™) Systems; RFIDPH01—Jun. 2005 White Paper.
(Continued)

*Primary Examiner* — Tai T Nguyen
(74) *Attorney, Agent, or Firm* — Fleit Gibbons Gutman Bongini & Bianco P.L.

(57) ABSTRACT

An authenticated RFID system is provided that uses elliptic curve cryptography (ECC) to reduce the signature size and read/write times when compared to traditional public key implementations such as RSA. Either ECDSA or ECPVS can be used to reduce the signature size and ECPVS can be used to hide a portion of the RFID tag that contains sensitive product identifying information. As a result, smaller tags can be used or multiple signatures can be written at different stages in a manufacturing or supply chain. A key management system is used to distribute the verification keys and aggregate signature schemes are also provided for adding multiple signatures to the RFID tags, for example in a supply chain.

30 Claims, 23 Drawing Sheets

(56) References Cited

U.S. PATENT DOCUMENTS

| | | | |
|---|---|---|---|
| 6,970,070 | B2 | 11/2005 | Juels et al. |
| 6,980,087 | B2 | 12/2005 | Zukowski |
| 7,249,259 | B1 | 7/2007 | Vanstone et al. |
| 7,705,732 | B2 * | 4/2010 | Bishop et al. ............... 340/572.1 |
| 7,755,469 | B2 * | 7/2010 | Sung et al. ................... 340/10.1 |
| 8,037,294 | B2 * | 10/2011 | Nochta .......................... 713/150 |
| 2003/0006121 | A1 * | 1/2003 | Lee et al. ....................... 194/206 |
| 2004/0246103 | A1 | 12/2004 | Zukowski |
| 2005/0108044 | A1 * | 5/2005 | Koster .............................. 705/2 |
| 2006/0077034 | A1 | 4/2006 | Hillier |
| 2006/0151990 | A1 * | 7/2006 | Cowburn ........................ 283/82 |
| 2006/0200674 | A1 | 9/2006 | Welker et al. |
| 2007/0021843 | A1 | 1/2007 | Neill et al. |
| 2007/0057768 | A1 | 3/2007 | Zeng et al. |
| 2007/0106897 | A1 * | 5/2007 | Kulakowski .................. 713/171 |
| 2008/0001724 | A1 * | 1/2008 | Soleimani et al. ......... 340/10.51 |
| 2012/0233469 | A1 | 9/2012 | Vanstone |

FOREIGN PATENT DOCUMENTS

| | | |
|---|---|---|
| JP | 11231777 | 8/1999 |
| JP | 2001125482 | 5/2001 |
| JP | 2004-318645 | 11/2004 |
| JP | 2005-518324 A | 6/2005 |
| JP | 2006-238142 A | 9/2006 |
| JP | 2007-080272 A | 3/2007 |
| JP | 2008-502058 A | 1/2008 |
| JP | 2008-257696 | 10/2008 |
| JP | 2009-540703 A | 11/2009 |
| WO | 9722092 | 6/1997 |
| WO | 03/073201 A2 | 9/2003 |
| WO | 2005/111920 A1 | 11/2005 |

OTHER PUBLICATIONS

FDA Counterfeit Drug Task Force Report: 2006 Update.
Ben-Or, M. et al.; "Completeness Theorems for Non-Cryptographic Fault-Tolerant Distributed Computation"; Proceedings of the twentieth Annual ACM Symposium on Theory of Computing; 1988; pp. 1 to 10; Chicago, Illinois, U.S.A.
Chaum, D. et al.; "Multiparty Unconditionally Secure Protocols"; Proceedings of the twentieth Annual ACM Symposium on Theory of Computing; 1988; pp. 11 to 19; Chicago, Illinois, U.S.A.
Boneh, D. et al.; "Aggregate and Verifiably Encrypted Signatures from Bilinear Maps"; Advances in Cryptology—Eurocrypt 2003, Lecture Notes in Computer Science 2656, May 2003; pp. 416 to 432; International Association for Cryptologic Research; Springer-Verlag; Berlin, Germany. Available at http://eprint.iacr.org/2002/175.
Okamoto; T.; "A Digital Multisignature Scheme Using Bijective Public-Key Cryptosystems"; ACM Transactions on Computer Systems; Nov. 1988; pp. 432 to 441; vol. 6, No. 8; ACM; New York, U.S.A.
Gemmel, P.; "An Introduction to Threshold Cryptography"; CryptoBytes; 1997; pp. 7 to 12; vol. 2, No. 3; RSA Laboratories.
Jean, G.; International Search Report from corresponding PCT/CA2007/001567; Nov. 8, 2007.
Authenticated RFID Reference Guide; Draft ver. 4.0; Aug. 2005; Texas Instruments, 3M, and VeriSign.
Annex A: Approved Security Functions for FIPS PUB 140-2, Security Requirements for Cryptographic Modules; Apr. 3, 2006, Draft; National institute of Standards and Technology.
Gorantla, M. C. et al.; "Verifiably Encrypted Signature Scheme with Threshold Adjudication"; 2006; http://eprint.iacr.org/2006/343.pdf.
Shao, J. et al.; "Efficient ID-based Threshold Signature Schemes without Pairings"; 2006; http://eprint.iacr.org/2006/308.
Wei, V. K. et al.; "(Hierarchical Identity-Based) Threshold Ring Signatures without Random Oracles"; 2006; http://eprint.iacr.org/2006/193.pdf.
Li, J. et al.; "Identity-Based Signature and Key-Insulated Threshold Signature"; 2005.
Crutchfield, C. et al; "Generic On-line/Off-line Threshold Signatures"; 2005; http://eprint.iacr.org/2005/418.pdf.
Maneva-Jakimoska, K. et al.; "Threshold Ring Signatures Efficient for Large Sets of Signers"; 2005; http://eprint.iacr.org/2005/227.pdf.
Cao, Z.; "On a Threshold Group Signature Scheme and a Fair Blind Signature Scheme"; 2004; http://eprint.iacr.org/2004/316.pdf.
Yang, F. et al.; "Cryptanalysis of a threshold proxy signature with known signers"; 2004; http://eprint.iacr.org/2004/313.pdf.
Guo, L.; "Security of Wang-Li Threshold Signature Scheme"; 2004; http://eprint.iacr.org/2004/302.pdf.
Guo, L.; "Cryptanalysis of Threshold-Multisignature Schemes"; 2004; http://eprint.iacr.org/2004/273.pdf.
Xu, J. et al.; "Identity Based Threshold Proxy Signature"; 2004; http://eprint.iacr.org/2004/250.pdf.
Tan, Z. et al. "On the security of some nonrepudiable threshold proxy signature schemes with known signers"; 2004; http://eprint.iacr.org/2004/234.pdf.
Chow, S.S.M. et al.; "Identity Based Threshold Ring Signature"; 2004; http://eprint.iacr.org/2004/179.pdf.
Chu, C. et al.; "A Threshold GQ Signature Scheme"; 2003; http://eprint.iacr.org/2003/016.pdf.
Boldyreva, A.; "Efficient threshold signature, multisignature and blind signature schemes based on the Gap-Diffie-Hellman-group signature scheme"; Aug. 12, 2002; http://eprint.iacr.org/2002/118.pdf.
Daza, V. et al.; "Some Applications of Threshold Signature Schemes to Distributed Protocols"; 2002; http://eprint.iacr.org/2002/081.pdf.
Abdalla M. et al.; "Forward Security in Threshold Signature Schemes"; Jun. 16, 2000; http://eprint.iacr.org/2000/031.pdf.
Shoup, V.; "Practical Threshold Signatures"; 1999; http://eprint.iacr.org/1999/011.pdf.
Eberle, H. et al.; "A Public-key Cryptographic Processor for RSA and ECC"; Proceedings of the 15th IEEE International Conference on Application-Specific Systems, Architecture and Processors (ASAP'04); Sep. 27 to 29; Galveston, Texas; Sep. 27, 2004; pp. 98 to 110; IEEE; ISBN: 978-0-7695-2226-5.
IEEE Std 1363a™-2004; "IEEE Standard Specifications for Public-Key Cryptography—Amendment 1: Additional Techniques"; 2004; IEEE; ISBN: 9780-0-7381-4004-9.
IEEE Std 1363-2000"; IEEE Standard Specifications for Public-Key Cryptography"; Jan. 2000; IEEE; ISBS: 978-0-7381-1956-4.
Manet, Pascal; Supplementary search report from corresponding European Application No. 07800588.1; search completed Feb. 3, 2011.
Pintsov L. et al.; "Postal Revenue Collection in the Digital Age"; FC 2000; LNCS; vol. 1962; 2001; pp. 105 to 120; Springer-Verlag.
Examination Report mailed Jul. 6, 2012, in corresponding EP Patent Application No. 07800588.1.
English abstract of JP 2006-238142, published Jul. 9, 2006 and retrieved on Oct. 22, 2012.
English language abstract for JP11-231777; published on Aug. 27, 1999 and retrieved on Jan. 15, 2014.
Office Action mailed Jan. 15, 2014; in corresponding Japanese patent application No. 2013-51471.
English translation of the Office Action mailed Jan. 15, 2014; in corresponding Japanese patent application No. 2013-51471.
English abstract for JP2001125482; published on May 11, 2001 and retrieved on Feb. 21, 2014.
Office Action mailed Oct. 23, 2014; in corresponding Canadian patent application No. 2,662,675.

* cited by examiner

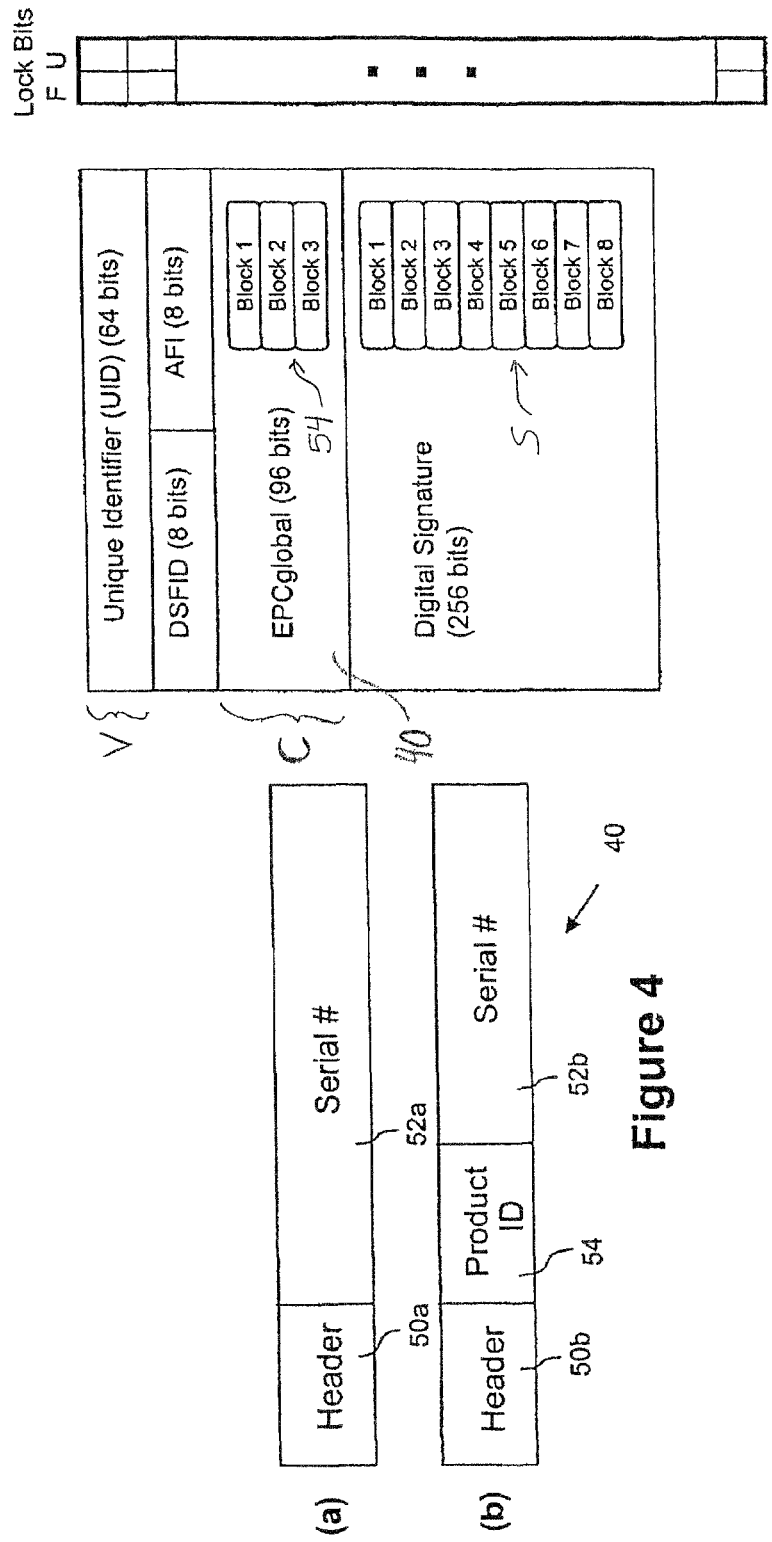

AUTHENTICATED RADIO FREQUENCY IDENTIFICATION AND KEY DISTRIBUTION SYSTEM THEREFOR

This application claims priority from U.S. application. Nos. 60/824,921 filed on Sep. 8, 2006; 60/865,566 filed on Nov. 13, 2006; and 60/929,816 filed on Jul. 13, 2007; the contents of which are incorporated herein by reference.

FIELD OF THE INVENTION

The present invention relates generally to radio frequency identification (RFID) tags and RFID authentication systems, and has particular utility in signing and authenticating RFID tags.

DESCRIPTION OF THE PRIOR ART

Traditionally, objects such as inventory and commercial products have been given an associated identifier to allow the object to be tracked, identified and/or monitored. Recently, barcodes are becoming displaced by radio frequency identification (RFID) technology for providing the identifiers. RFID is beneficial as it provides an automatic identification system rather than requiring a user or machine to locate the barcode tag and then scan the barcode in a particular way.

RFID relies on the storage and remote retrieval of data using devices typically referred to as RFID tags or RFID transponders. An RFID tag is an object that can be attached to or incorporated into a product or even a living being such as an animal for the purpose of identification using radio waves. There are chip-based RFID tags that contain silicon chips and antennas and RFID tags can be either passive or active.

Passive RFID tags require no internal power source. The relatively small electrical current induced in the antenna by the incoming radio frequency signal provides enough power for the circuit in the tag to power up and transmit a response. Often, passive tags signal by backscattering the carrier signal from the reader and thus the antenna is designed to both collect power from the incoming signal and also to transmit the outbound backscatter signal. Without requiring an onboard power supply, passive RFID tags can be smaller and more cost effective to implement.

Active RFID tags have their own internal power source which is used to power any circuit resident on the tag that generates an outgoing signal. Active tags have been found to be more reliable than passive RFID tags since active tags can conduct a "session" with a reader. With an onboard power supply, an active RFID tag can transmit a higher power signal which allows them to be more effective in areas where RF signals have trouble transmitting e.g., water, and relatively long distances. The onboard power supply also requires more space and thus active RFID tags are generally larger and more expensive than passive RFID tags.

An RFID system generally comprises tags, tag readers, and supporting infrastructure. The purpose of an RFID system is to enable data to be transmitted by a mobile device (the tag), which is read and processed by an RFID reader. The amount of processing and the nature of the data is largely dependent on the application. For example, the information transmitted by the tag may provide, identification or location information, or specifics about the object to which the tag is affixed. In typical applications such as for inventory tracking, the RFID system uses small, inexpensive tags affixed to objects that are to be tracked. The tag contains a transponder with a memory that is given a unique code (e.g. product code). A signal is emitted from the reader that activates the RFID tag so that the reader can read and write data to the tag. When the RFID tag passes through the electromagnetic zone created by the emission, the tag detects the reader's activation signal. The reader decodes the data encoded in the tag's memory and the data is passed to the supporting infrastructure for its particular use.

RFID technology is becoming more popular not only for reducing the effort involved in tracking inventory and commercial products, but also for combating security issues such as the existence of counterfeit or compromised products. Such security issues have become increasingly important in the pharmaceutical industry for advancing the security of the pharmaceutical supply chain and improving patient safety. Current work includes adding a layer of authentication to pharmaceutical drugs in the supply chain, in particular using a public-key infrastructure (PKI) combined with an RFID system as discussed in the white paper entitled "Securing the Pharmaceutical Supply Chain with RFID and Public-Key Infrastructure (PKI) Technologies" by Joseph Pearson, Texas Instruments Radio Frequency Identification (TI-RFID™) Systems, RFIDPH01, June 2005.

An authenticated RFID system such as that described in the above-noted white paper allows the tag to be authenticated at one or more stages in the supply chain to ensure supply-chain integrity throughout.

The above-noted implementation requires an RFID tag that is large enough to store a relatively large signature, e.g. 1024 bit digital Rivest-Shamir-Adleman (RSA) signature, which can be prohibitively expensive. As a result, the authenticated RFID tags, when signed with an RSA signature, can only accommodate one signature without requiring a tag that may be too expensive to use. Even when only one signature is desired, a relatively large tag is still required.

The use of such relatively large RSA signatures also makes the use of multiple signatures on the same tag infeasible without increasing the tag size even further which can be even more prohibitively expensive.

It is therefore an object of the following to obviate or mitigate the above-noted disadvantages.

SUMMARY OF THE INVENTION

In one aspect, there is provided a method for managing verification keys for a plurality of RFID readers in an authenticated REID system comprising determining a set of permissions indicative of which of one or more of the plurality of REID readers have permission to authenticate one or more product types; for one or more of the plurality of readers, preparing a set of verification keys according to the set of permissions, each verification key being associated with a specific product type; and distributing each the set of verification keys to respective RFID readers.

In another aspect, there is provided a key management system for an authenticated RFID system having a plurality of RFID readers configured for determining a set of permissions indicative of which of one or more of the plurality of RFID readers has permission to read one or more product types having corresponding RFID tags; preparing a set of verification keys for each of the plurality of readers according to the permissions; and distributing the verification keys to the readers.

In yet another aspect, there is provided a computer readable medium carrying computer executable instructions for performing the method of managing verification keys.

BRIEF DESCRIPTION OF THE DRAWINGS

An embodiment of the invention will now be described by way of example only with reference to the appended drawings wherein:

FIG. 4 is a block diagram of two different RFID identification (ID) codes.

FIG. 5 is a schematic diagram of a 256 bit RFID tag.

DETAILED DESCRIPTION OF THE INVENTION

Authenticated RFID System and Example Supply Chain

Figure 1:
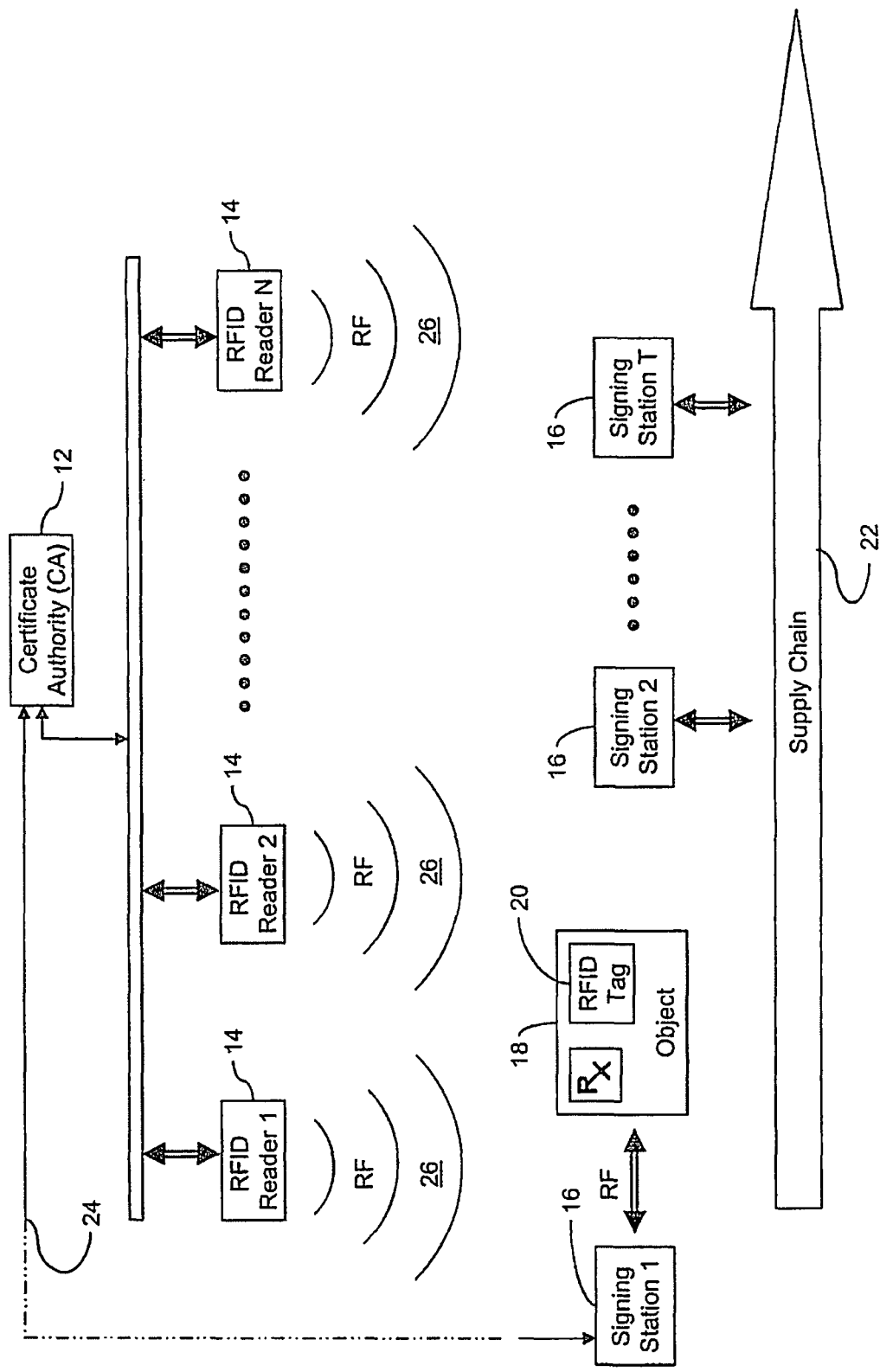
FIG. 1 is a schematic block diagram showing an authenticated RFID system.

Referring to FIG. 1, an authenticated RFID system 10 is shown. The system 10 shown comprises a certificate authority (CA) 12 for issuing certificates to control the distribution of public keys in one embodiment, an arbitrary N number of RFID readers 14 distributed along a supply chain 22 for reading an RFID tag 20 affixed to an object 18 (e.g. a pharmaceutical product, consumer product, piece of luggage, mobile communication device, etc.), and an arbitrary T number of signing stations 16 for writing signatures to the RFID tags 20 in establishing an electronic pedigree for the tag 20. Each reader 14 produces a radio frequency (RF) field 26 which energizes the tags 20, which in this example are preferably passive. It will be appreciated that the tags 20 may also be active if the cost can be justified for the particular application.

The CA 12 preferably communicates with the readers 14 and the signing stations 16 over a communication channel 24 to facilitate the distribution of keys through the issuance of certificates and for log reporting as necessary. The communication channel 24 may be electronic such as a local or wide area network (secure or insecure with cryptographic safeguards) or may be implemented by distributing media such as CD-ROM disks or by deploying technicians. Therefore, it will be appreciated that the readers 14 and signing stations 16 may operate together in a network or as substantially standalone units.

In some applications, there may be little or no relationship between particular ones of the readers 14 and the signing stations 16 such that they are under the control of different parties. Therefore, each party may be required to contact and communicate with the CA 12 individually in order for the readers 14 to each be able to validate the signatures written by the signing stations. It will be appreciated that the participation of a CA 12 is only one implementation and that any other management or controlling entity could also be used as will be discussed later.

Figure 2:
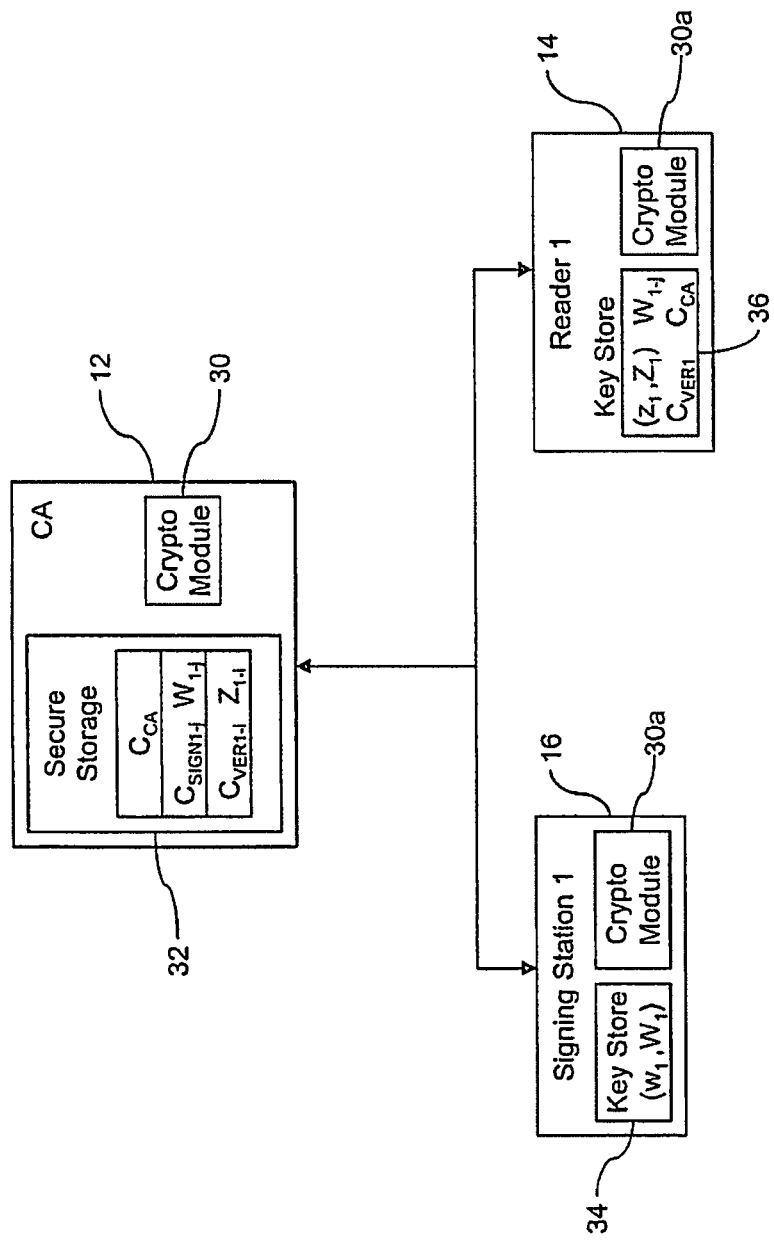
FIG. 2 is a schematic block diagram showing the certificate authority (CA), a signing station and a verifying station shown in FIG. 1.

The schematic block diagram of FIG. 2 shows a general embodiment for the distribution of keys between a CA 12, a signing station 16 and a reader 14. The CA 12 issues certificates for both the signing station 16 and the reader 14. The CA 12 may also be capable of issuing sub-CA certificates so that other CAs (not shown) can issue reader certificates. The certificates are used to distribute and validate public keys and a certificate is not typically stored on the RFID tag 20. Since the certificates are not stored on the tags 20, the entire chain of certificates for all signing readers 16 is distributed to each reader 14 so that they may validate each and every signature that is written to the tag 20. The CA 12 includes a crypto module 30 for performing cryptographic operations and for generating certificates. The CA 12 also includes a secure storage device 32 for storing keys and certificates. Each CA 12 has a CA certificate $C_{CA}$, and stores the public keys $W_{1-T}$ of the signing stations 16, the public keys of the readers $Z_{1-N}$ and the respective certificates $C_{SIGN1-T}$ and $C_{VER1-N}$ that are to be distributed. In general, j indicates the specific signing station 16 where j is a number from 1 to T and i indicates the specific reader 14 where i is a number from 1 to N (according to the arbitrary designations shown in FIG. 1).

In one embodiment, the CA 12 generates the private keys of the readers 14 (which correspond to the respective public keys $Z_{1-N}$) and provides such private keys to a manufacturer of the readers 14 in a bulk encrypted set, along with the certificates $C_{VER1-N}$. This embodiment provides additional assurance of the integrity of the keys, since the CA 12 can state that the operators generating the keys did not have unencrypted access to the private keys. The provision of private keys and manufacturing of the readers 14 is discussed below in connection with FIG. 11.

The signing stations 16 are attached to RFID readers and are capable of generating elliptic curve cryptography (ECC) signatures using a crypto module 30a and writing them to the RFID tags 20. Preferably, the signing stations 16 are not used to verify signatures from other signers 16 and thus typically do not need to access certificates from other RFID readers, both signing and verifying. The signing station 16 shown in FIG. 2 designated signing station 1, has a private/public key pair $(w_1, W_1)$ stored in a key store 34 and an ECC crypto module 30a. The private key $w_1$ is preferably stored in secure hardware and protected with a password or other mechanism.

The readers 14 are used for verifying the signatures written to the tags 20 by the signing stations 16 and typically are not used for or capable of generating signatures. Preferably, each reader 14 has its own key pair, e.g. $(z_1, Z_1)$ for reader 1. The private key $z_1$ is used to decrypt signer certificates $C_{SIGN1}$ and the public key $Z_1$ corresponds to the private key $z_1$ and has a corresponding certificate $C_{VER1}$. The reader 14 also stores a copy of the CA certificate $C_{CA}$ and a list of validated public keys $W_j$ for the various signing stations 16. The reader 14 also has a crypto module 30a that is capable of validating certificates and verifying ECC signatures.

RFID Authentication Schemes using Elliptic Curve Cryptography

Figure 3:
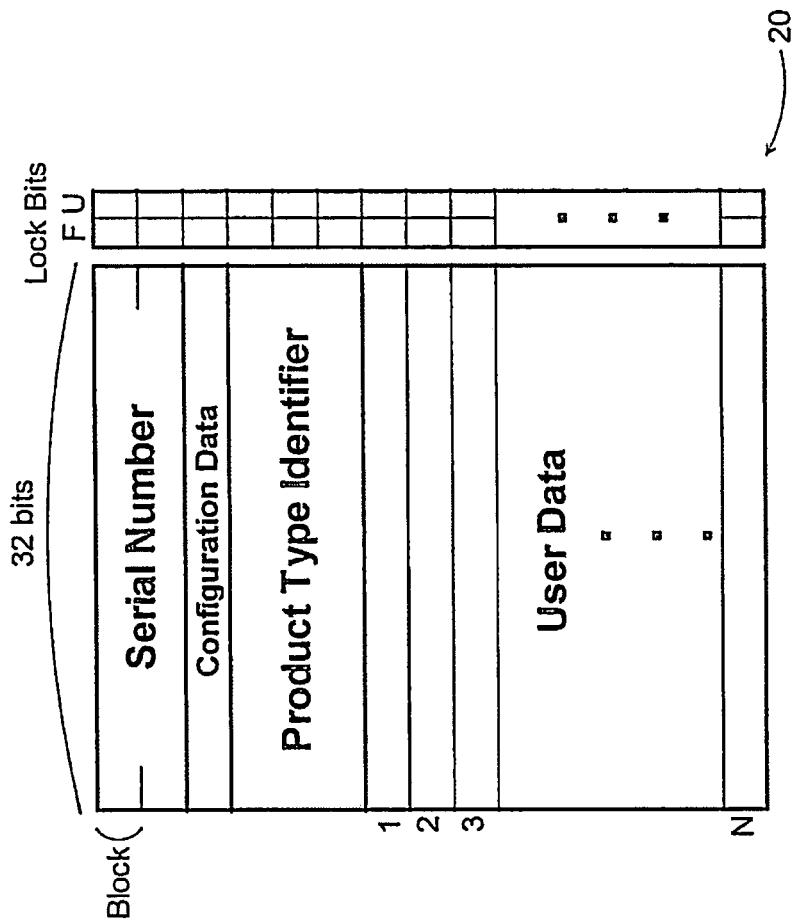
FIG. 3 is a schematic diagram of a generic RFID tag.

A generic RFID tag 20 is shown in FIG. 3. The tag 20 is used primarily for data storage and the firmware for the tag 20 is locked at the manufacturing stage. As such, these tags 20 respond to a fixed set of commands once they leave the factory. The commands are used for reading, writing and locking data blocks. FIG. 3 illustrates a typical memory organization for such a tag 20. In the example shown in FIG. 3, the tag 20 is segmented into 32 bit blocks with two lock bits for each block, a factory lock bit (F) and a user lock bit (U). At the time of manufacture, the tag 20 is given a serial number, which in this example consumes 2 blocks or 64 bits. The serial numbers are preferably burned into read only memory (ROM) by a trusted party to ensure that each tag 20 is unique. At the time of manufacturing, configuration data is also added to the tag 20 and in this example consumes all or a portion of 1 block (i.e. up to 32 bits). In applications such as a pharmaceutical supply chain, product specific information such as a product type identifier is also added, according to the appropriate standards and regulations. In this example, the product type identifier consumes 3 blocks or 96 bits. The remaining memory on the tag 20 is dedicated to user data, which may include, e.g. a digital signature. It can be seen that FIG. 3 shows an arbitrary N blocks of user data. A 2048 bit tag, which is commonly in use would thus provide 64 blocks of data for storing signatures. A 256 bit tag would provide 8 blocks of data.

An example of a 256 bit tag 20 to be used in an authenticated RFID system is shown in FIG. 5. The serial number in this example is a unique identifier (UID), which is programmed and locked at the factory and is unique to each tag 20 and is typically 64 bits as shown. The configuration data comprises a data storage format identifier (DSFID), which is used to identify how the user data was encoded and stored on the tag 20; and an application family identifier (AFI), which can be used to identify with which of a plurality of numbering systems the UID is associated (if applicable). In this example, the DSFID and AFI consume 8 bits each and thus there would be 16 empty bits if they are written to the same block or potentially 48 empty bits if they are each written to separate and consecutive blocks. The product type identifier is in FIG. 5, a 96 bit EPCglobal product ID. As will be discussed below, at least a portion of the product ID may included sensitive or confidential information regarding the product 18 to which the tag 20 is affixed thus creating privacy concerns as any reader 14 could presumably read such portion of the product ID without the proper safeguards in place. The user data provides 8 blocks for a digital signature for a 256 bit tag.

It can be appreciated that an RSA signature is too large to be written to such a 256 bit tag 20 and would instead require a large tag such as a 2048 bit tag 20. It can also be appreciated that an RSA signature would also be too large for tags 20 of other sizes such as 512 bits. Also, an RSA signature can be cloned when read from a genuine tag and programmed onto another. However, since the tags 20 are unique and cannot be reprogrammed, a cloned signature will not be successfully verified. It is seen from FIG. 3 that a signature such as an RSA signature would consume a significant portion of the tag 20 (or require there to be a relatively large number of user data blocks) and only one signature can be accommodated without having the tag become prohibitively expensive.

The writing and reading of, e.g., 1024 bit RSA signatures, to and from RFID tags 20 can create a significant bottleneck in the manufacturing process. It is therefore desirable to replace an RSA signature with a smaller one, while maintaining a similar level of security. The size of a 1024 bit RSA signature requires a relatively large RFID tag (e.g. 2048 bits) that can only accommodate one signature. To reduce such bottlenecks, to provide the possibility of including multiple signatures on the same RFID tag 20 (e.g. representing stages in the manufacturing process), and to provide the possibility of using a smaller (and thus cheaper) RFID tag 20, a signature with similar security but that is smaller in size is required. It has been recognized that an elliptic curve cryptography (ECC) signature is particularly suitable for providing these features and advantages when considering the following analysis.

ECC is implemented in an algebraic system defined on the points of an elliptic curve over a finite field and encryption schemes using ECC are based on the intractability of the discrete log problem in finite groups.

In one example, the domain parameters of such an ECC cryptosystem are a curve of the form $y^2=x^3+dx+c$ and a seed point P. One correspondent in the system has a private key a, $0<a<n$ where n is the order of the point P and a corresponding public key $Q_A=aP$. The public key may be held in a certifying authority (CA). The following principles are also applicable in binary $F_{2^n}$ applications.

When compared to RSA, ECC offers the same security with smaller bit sizes. The following table taken from "Recommendation for Key Management—Part 1: General Revised", NIST Special Publication 800-57, National Institute of Standards and Technology, May 2006, compares the bit sizes of ECC and RSA at similar security levels.

TABLE 1

Comparison of RSA and ECC

| Bits of security | Symmetric key algorithms | FFC (e.g., DSA, D-H) | IFC (e.g. RSA) | ECC (e.g., ECDSA) |
| --- | --- | --- | --- | --- |
| 80 | 2TDEA | L = 1024<br>N = 160 | k = 1024 | f = 160-223 |
| 112 | 3TDEA | L = 2048<br>N = 224 | k = 2048 | f = 224-255 |
| 128 | AES-128 | L = 3072<br>N = 256 | k = 3072 | f = 256-383 |
| 192 | AES-192 | L = 7680<br>N = 384 | k = 7680 | f = 384-511 |
| 256 | AES-256 | L = 15360<br>N = 512 | k = 15360 | f = 512+ |

To achieve the same security level as a 1024 bit RSA signature, an elliptic curve of 160 bits or higher should be used. The examples described herein compare the use of elliptic curve Pintsov-Vanstone signature (ECPVS) scheme and the use of the elliptic curve digital signature algorithm (ECDSA), to the use of public key schemes such as RSA. It will be appreciated that other ECC schemes are applicable.

ECPVS is a digital signature scheme with message recovery, which means that pall of the message that was signed can be recovered from the signature verification process. ECPVS is specified in IEEE 1363a-2004, ISO/IEEE 9796-3, and as a draft ANSI standard. In ECPVS, a message M that is to be signed is considered to be two separate and distinct portions or sets of data H and V (e.g. M=H∥V) where H is a message or a set of data that is to be hidden in the signature and recovered during the verification process, and V is a message or set of data which is also signed but is sent in the clear (or otherwise be readily or publicly available) and used in the verification process. The message H can only be recovered by those entities that possess a particular verification key and the message V can be read by any entity, e.g. any RFID reader 14, i.e. without verifying the signature.

The ECPVS signature generation algorithm typically begins by specifying a particular characteristic for the message H that can be examined during signature verification to verify the signature. For example, one can determine if the message H has a certain amount of redundancy that is above a predetermined limit sufficient to prevent an existential forgery attack. If it is determined that the original data forming the message M contains enough redundancy then H may simply be a subset of that data. If the predetermined redundancy is not found, then H may be modified to contain artificially added redundancy such as additional zeros. It will be appreciated that having a certain amount of redundancy is only one characteristic and others may be used such as any string or set of data that can be compared to a known and expected value.

For example, 80 bits of redundancy is typically what is needed to provide the same level of security as 1024 bit RSA and should preferably be chosen as the minimum threshold when the same security or better than 1024 bit RSA is desired. However, as discussed below, the amount of redundancy used can be tailored to suit the application based on the size of tag that is desired, and the minimum security level that makes forging the signature uneconomical or which is otherwise deemed to be acceptable. The following summarizes ECPV signature generation.

First, an ephemeral key pair (k, Q) is generated, where Q=kG is a point on the elliptic curve, k is a random integer $1 \leq k < n$, and n is the order of the group generated by the elliptic curve base point G. Next, a key $k_1$=KDF(Q) is constructed, where KDF is a key derivation function. In general, a key derivation function is used to derive a secret key from a secret value and/or a other known information. In ECPVS, KDF takes as an input a point, Q, and possibly other information, and generates an encryption key $k_1$. The signing entity then computes a first signature component c as c=$ENC_{k_1}$(H), i.e. the encryption of the message H using a key $k_1$, where ENC is a suitable encryption scheme that takes as an input plaintext (e.g. H) and encrypts it with a key $k_1$ to produce ciphertext c.

Next, an intermediate component h is computed as h=Hash(c∥V), where Hash is a suitable hash function, e.g. SHA1. If pretended, additional information that may be available or become available to parties verifying the signature (in other words information that the verifier needs 'on the side' for verification), e.g. a certificate or identifying information of the signer may be incorporated into h. The intermediate component h is then converted to an integer e. A second signature component s is then calculated using a suitable signature algorithm, such as the Schnorr algorithm, where: s=e·w+k mod n, w being a long term private key of the signing entity, namely the signing station in the examples discussed above. The resultant signature is then (c, s, V) or (s, c∥V).

The following illustrates ECPV signature verification on a signature (s, c∥V), when provided with the signing entity's genuine public key W. First, the intermediate component h is computed using the component c∥V and using the same hash function used in the signing stage and any additional information, such as the identification information of the signer, where: h=Hash(c∥V). Next, h is converted to an integer e. A representation Q' of the ephemeral public key Q is then computed using the integer e, the public key W of the signer, the base point G, and the signature component s, e.g. as Q'=sG−eW.

Next, a decryption key $k_1'$ is computed using the same key derivation function KDF used in the signing stage, including the same additional information, namely as $k_1'$=KDF(Q'). A representation H' of the hidden portion H is then recovered by decrypting the component c using the key derived above, and a complementary decryption function DEC, namely as H'=$DEC_{k_1'}$(c). The verifier may then check the specified characteristic (such as a particular format) of, e.g., redundancy contained in H'. If H' contains the necessary characteristic such as a certain amount of redundancy, then H' is a valid message and the signature is verified. If H' does not contain the necessary redundancy, then a null and invalid signature is returned.

Because the message M is subdivided, it is only necessary for one portion, e.g. H to contain the requisite characteristic such as redundancy, and to be hidden. The other portion V is plaintext that has the same structure as the original message and thus can improve bandwidth efficiency. As such, for an RFID tag, the visible portion V may include any portion of data that is otherwise available to RFID readers 14. The portion H hidden in c is only available to those individuals who have the public key W of the signer, whereas the data contained in V is available to all. Although the principles described herein where a portion of data is hidden to conceal sensitive information is particularly suitable for a pharmaceutical supply chain as exemplified below, it will be appreciated that such principles are equally applicable to any RFID authentication system for any product type and in any environment where authentication and privacy or confidentiality is desired. For example, the principles below are also applicable to tracking baggage in an airport, tracking any merchandise, or for authenticating users of mobile devices utilizing RFID technology, etc.

The use of ECPVS in authenticating the RFID system 10 described herein allows part of the identifying information on the tag 20 to be kept secret from unauthorized readers whilst allowing conventional readers to read the remaining data, e.g. for regular scanning operations. This is because a certain portion of data can be hidden in the signature and any other non-sensitive information can simply remain on the tag 20 as is or included as part of the plaintext V. Also, since an ECPVS signature is smaller than a 1024 bit RSA signature, a smaller tag can be used with similar security. For example, a 512 bit tag or 256 bit tag can be used depending on the application, the level of security required and the availability of such tags as will be explained in greater detail below.

An product identification (ID) code 40 (e.g. EPCglobal code) is generally shown in FIG. 4. The size of the ID code 40 is assumed to be 96 bits in the following discussion. Variation (a) includes a header 50*a* and a serial number 52*a*. Variation (b) includes a header 50*b*, serial number 52*b* and a product ID 54. The product ID 54 may be part of the serial number 52*b* or a distinct code. The product ID 54 reveals the type of product to which the tag 20 is attached.

In industries such as the pharmaceutical industry, the use of variation (b) ID codes 40*b* have been viewed as posing a privacy issue since the code 40*b* reveals what the product is. Therefore an illegitimate reader could potentially discern what a customer is purchasing when within the requisite range. These privacy concerns are discussed in a Food and Drug Administration (FDA) report, "FDA Counterfeiting Drug Task Force Report: 2006 Update", which in part recommends not revealing the NDC number on the RFID tag, the NDC number containing the information that identifies the drug.

It is therefore desirable to encrypt or hide at least the product ID 54 where a variation (b) code 40b is used so that an illegitimate reader cannot discern the product type. It has been recognized that ECPVS provides a suitable ECC signature scheme (for size and efficiency) that can also hide the product ID 54 in the signature by designating the ID code 40 as the message to be signed and having the product ID 54 designated as portion H, which is hidden and recovered during verification.

Also, using ECPVS, either variation (a) or variation (b), the entire ID code 40 can be chosen as H and the non-recoverable or visible portion V can be the UID. In a simple example, ECPVS allows a digital signature to fit within an RFID tag 20 with 256 bits of storage (see FIG. 5) as set forth in the following table:

TABLE 2

Signature sizes for ECPVS

| ID Code (bits) | Curve | ECPVS Signature Element | Size (bits/bytes) | Total Size - Message and Signature (32 bit RFID memory blocks) |
| --- | --- | --- | --- | --- |
| 96 | 160 bit - SECP160R1 | $r_{ecpvs}$ $s_{ecpvs}$ | 96/12 160/20 | 8 |
|  | 163 bit - SECT163K1 (NIST recommended) | $r_{ecpvs}$ $s_{ecpvs}$ | 96/12 163/21 | 9 (29 unused bits in last block) |

In a practical implementation, several issues should be considered. First, if the entire ID code 40 is hidden (to be recovered during signature verification), then the readers 14 not supporting ECPVS, or not possessing the correct public key $Z_i$, would not be able to read the ID code 40 at all. The ID code 40 itself can be divided into recoverable and non-recoverable portions (e.g. where product ID 54 is recoverable), however the redundancy of the recoverable portion may be insufficient. If the ID Code 40 is to be sub-divided, the RFID tag 20 may need to be larger if additional redundancy is required and/or other ways of adding redundancy, e.g. padding would need to be explored in order to provide adequate security.

Second, the IEEE Standard 1363a-2004 specifies that the recoverable message H be padded with at least 1 byte. If it is desirable to comply with this standard, an extra byte of storage is required. Third, if a 256 bit tag 20 is used, there may be no room to store data such as the time of signing unless some of the unused bits in the AFID are used. Finally, there may not be enough redundancy in the ID Code 40 to allow the verifier 14 to determine if the signature is valid. Some out-of-band information (e.g. visual verification with a paper label) may be required. The issue of redundancy is addressed below.

As discussed, there are two types of ID codes 40a, b. The variation (a) fields cannot be directly linked to the product. In a variation (b) code 40b, the product ID 54 directly identifies the product. It is therefore desirable to encrypt or hide at least the product ID 54, namely by making the product ID 54 at least a portion of the hidden message H.

It can be appreciated that, depending on the application, the ID code 40 may not contain enough redundancy and may require that a pattern or limit be imposed on the fields to avoid a vulnerability to signature forgery.

With the 160 bit curve and SHA-1 as the hash function, the typical rule-of-thumb is to use 80 bits of redundancy. However, since each forged signature is specific to one particular RFID tag 20, it may be adequate to use a smaller number. Moreover, it may be that the amount of computing power and/or time to forge one signature is long enough to deter a forger from attempting to forge the signature. The security level should be tailored to provide enough of a deterrent to such a forger.

To offer the same security level as a 1024 bit RSA signature, an ECPVS signature with a 160 bit curve would fit within the 256 bit structure shown in FIG. 5. The product ID 54 (if present) and an "other" portion such as parts of the ID code 40 that contain redundancy would form the recoverable message H. The remainder of the ID code 40 and the UID would then form the non-recoverable portion V. There should be enough information available from the non-recoverable portion V to identify the signing station 16. For example, with an encryption key k, the signature component c can be computed as $c=ENC_k$(product ID+other). Also, with the serial number and the header of the ID code 40 taken as the visible portion V, the intermediate component h can be computed as $h=HASH(c\|serial\ \#+header)$. In this example, any reader 14 can read the serial number and header information, but would require access to the proper verification key (e.g. W) to decrypt the product ID 54.

Unless there are 80 bits of redundancy, ECPVS does not offer the same level of resistance to counterfeit signatures as 1024 bit RSA. However, since each forged signature is only applicable to one particular RFID tag 20, a reduced level of resistance may be acceptable since other signatures would not be compromised.

To implement ECPVS without padding, and where no additional fields in the RFID tag 20 can be used to increase redundancy, the inherent redundancy of the ID code 40 should be relied upon to determine if the signature is valid. This may involve imposing certain patterns or structures to the ID code 40 or using some out-of-band information such as referring to a product database. Since part of the ID code 40 is contained in the recoverable portion H, readers 14 that do not support ECPVS are not able to read the entire ID code 40.

To implement ECPVS with padding, the AFI, DSFID and user lock (U) bits may be used to increase the redundancy of the recoverable message H. For example, as can be appreciated from FIG. 5, the AFI (when written to its own block) would have 24 unused bits, as well as the DSFID field and the user lock has 8 unused bits (if it is acceptable to leave user data block unlocked). These bits would then be available to provide padding.

Although the ideal level of padding is 80 bits, a lesser number of bits may be used if for the particular application such lesser padding is secure enough to make the forgery of signatures uneconomical.

With the extra padding, if may not be necessary to rely on the inherent redundancy in the ID code 40. Therefore, the entire code 40, with the exception of the Product ID 54, can be stored as the non-recoverable message V. All readers 14 will be able to read the ID code 40, but only readers 14 with the correct public key can recover the Product ID 54.

It can therefore be seen that smaller RFID tags 20 can be signed using ECPVS than those suitable to be signed with RSA. By examining the data structures of the information in the tag 20, varied levels of redundancy can be provided by padding unused blocks with such redundancy. Also, if the ID code 40 does not need to be read by unauthorized readers 14, redundancy in the ID code 40 can be relied upon, or imposed, in order to provide a desired amount of redundancy. It has thus been recognized that the use of ECC signatures on an RFID tag 20 can offer similar protection to RSA signatures whilst being smaller and more efficient. This allows smaller tags to be used (or a more efficient use of the available data blocks) and/or multiple signatures to fit on the same tag. This cannot be done when using RSA signatures due to their overall size.

It will be appreciated that the principles described herein regarding the use of ECPV signatures are equally applicable to other signature schemes with message recovery such as the Elliptic Curve Digital Signature with Recovery (ECDSR) described in U.S. Provisional Patent Application No. 60/935,855 entitled "Signatures with Confidential Message Recovery" filed on Sep. 4, 2007, the contents of which are incorporated herein by reference. When using ECDSR, the same considerations regarding security and tag size should be made similar to those discussed above.

In another embodiment, an ECDSA signature can be used for providing security to an RFID tag 20, in particular for a variation (b) ID code 40b where privacy is not an important issue.

ECDSA is a widely standardized elliptic curve-based signature scheme, appearing in the ANSI X9.62, FIPS 186-2, IEEE 1363-2000 and ISO/IEC 15946-2 standards as well as several draft standards.

ECDSA signature generation operates on several domain parameters, a private key d, and a message m, outputs the signature (r,s), where r and s are integers, and a summary of the algorithm is as follows.

1. Select $k \in_R [1, n-1]$, n being the order of the group generated by the elliptic curve base point, and being one of the domain parameters.
2. Compute $kP = (x_1, y_1)$ and convert $x_1$ to an integer $\bar{x}_1$, where P is a point on an elliptic curve E and is one of the domain parameters.
3. Compute $r = \bar{x}_1 \mod n$, wherein if r=0, then go back to step 1.
4. Compute e=H(m), where H denotes a cryptographic hash function whose outputs have a bitlength no more than that of n (if this condition is not satisfied, then the outputs of H can be truncated).
5. Compute $s = k^{-1}(e+dr) \mod n$, where if s=0, then go back to step 1.
6. Output the pair (r, s) as the ECDSA signature.

ECDSA signature verification operates on several domain parameters, a public key Q, the message m, and the signature (r, s) derived above. ECDSA signature verification outputs a rejection or acceptance of the signature, and proceeds as follows.

1. Verify that r and s are integers in the interval [1,n−1]. If any verification fails then a rejection is returned.
2. Compute e=H(m).
3. Compute $w = s^{-1} \mod n$.
4. Compute $u_1 = ew \mod n$ and $u_2 = rw \mod n$.
5. Compute $R = u_1 P + u_2 Q$.
6. If $R = \infty$ then the signature is rejected.
7. Convert the x-coordinate $x_1$ of R to an integer $\bar{x}_1$; compute $v = \bar{x}_1 \mod n$.
8. If v=r then the signature is accepted, if not then the signature is rejected.

As discussed above, an ECDSA signature is made up of two integers, namely r and s, both of which are the same size as the underlying field of the elliptic curve. For example, with a 160 bit curve, the signature size is 160×2=320 bits or 40 bytes.

If a message M is signed with ECDSA, then M, r and s are sent to the verifier, assuming that the verifier already possesses the correct public key Q.

The use of ECDSA in the authenticated RFID system 10 reduces the read/write times of digital signatures when compared to RSA, however, does not provide the privacy of ECPVS. The simplest way to implement ECDSA is to replace the 1024 bit RSA signature with an ECDSA signature of comparable security. The minimum curve size is typically required to be 160 bits, so an ECDSA signature occupies at least 320 bits. The smallest NIST recommended curve is 163 bits with a corresponding ECDSA signature size of 42 bytes. The following table illustrates the RFID memory required assuming that the ID CODE 40 occupies 96 bits.

TABLE 3

Signature Sizes for ECDSA

| ID Code (bits) | Curve | ECDSA Signature Element | ECDSA Size (bits/bytes) | Total Size - Message and Signature (32 bit RFID memory blocks) |
|---|---|---|---|---|
| 96 | 160 bit - SECP160R1 | $r_{ecdsa}$ $s_{ecdsa}$ | 160/20 160/20 | 13 |
|  | 163 bit - SECT163K1 (NIST recommended) | $r_{ecdsa}$ $s_{ecdsa}$ | 163/21 163/21 | 14 (16 unused bits in last block) |

The message that is signed using an ECDSA scheme can be a concatenation of the UID of the tag 20 and the ID code 40.

For a variation (a) code 40a, there is no Product ID 54. The signature element r can be computed using the padding alone. If the recovered message matches the expected padding, the signature is valid.

For a variation (b), the Product ID 54 may be replaced by an invalid value which does not correspond to any product. The actual Product ID 54 and the padding would then be used in the computation of r. If the recovered message matches the expected padding, the signature is valid. The reader 14 can then replace the invalid Product ID 54 with the recovered value to form the correct ID code 40b.

The ECC signature scheme that is chosen will typically depend on the amount of storage available on the RFID tag 20. It will be appreciated that the size of tag that is used can be chosen based on the security that can be acceptable, and based on the sizes that are available. An acceptable level of security is typically determined based on whether or not it would be economically feasible for a forger to forge a signature. If the redundancy in an ECPVS signature can be lowered and a forgery remain infeasible, then a smaller tag can be used. The examples used herein using 2048 bit and 256 bit tags are shown for illustrative purposes only and it will be appreciated that other tag sizes may instead be used, e.g. a 512 bit tag.

If a 2048 bit RFID tag 20 is used, either ECDSA or ECPVS can be used. ECDSA can be used to replace the RSA signature, and the digital signature will occupy 320 bits instead of 1024 bits, while offering the same level of security. The total storage required, including the ID code 40 is 416 bits or 13 memory blocks. It is therefore seen that using ECDSA allows multiple signatures to be written to a 2048 bit tag 20 whilst providing similar security and reducing the read/write time allowing an electronic pedigree to be established as the product 18 proceeds along the supply chain 22. However, unlike ECPVS, ECDSA cannot hide the product ID 54.

ECPVS can be used to further reduce the signature size and to hide the product ID 54 from readers 14 without the proper public key $Z_i$. With the additional storage space in a 2048 bit tag 20, padding can be used to increase the redundancy to an acceptable level. Without considering any inherent redundancy in the ID code 40, 80 bits of padding can be added to provide the same security as a 1024 bit RSA signature. The total storage required would be 96 bits for the ID code 40, 20 bits for product ID 54 and 80 bits of padding for r and 160 bits for s. A total of 356 bits or 12 memory blocks are thus used for the padded ECPVS signature. If a lower level of security is acceptable, the memory requirement can be further reduced. The following table summarizes the signature schemes that can be used with 256 and 2048 RFID tags.

TABLE 4

Comparison of ECC Signatures

| RFID Tag Memory (bits) | Signature Scheme | Advantage | Disadvantage |
| --- | --- | --- | --- |
| 256 | ECPVS without Padding | Uses 256 bit of storage | Non-ECPVS reader cannot access entire ID code |
| | | Hides Product ID from non-ECPVS reader | Imposes structure or pattern in ID code, or uses out-of-band information Lower forgery resistance than 1024 bit RSA |
| | ECPVS with Padding | Non-ECPVS reader can access entire ID code | Requires more than 256 bits of storage unless inherent redundancy used |
| | | Hides Product ID from non-ECPVS reader | Lower forgery resistance than 1024 bit RSA |
| 2048 | ECDSA | Non-ECDSA reader can access entire ID code | Cannot hide Product ID from non-ECDSA reader |
| | | Offers same security as 1024 bit RSA | |
| | ECPVS with Padding | Smaller signature size than ECDSA Non-ECDSA reader can access entire ID code Hides Product ID from non-ECPVS reader Offers same security as 1024 bit RSA | |

It can therefore be seen that a 2048 bit RFID tag 20 using ECPVS provides the ability to write more than one signature to the tag, e.g. at different stages in the supply chain 22 and allows the system 10 to hide the product ID 54 from unauthorized readers to add privacy. It will be appreciated that the above is for illustrative purposes only and that other tag sizes may be deemed appropriate according to the same principles and considerations discussed above.

Figure 6:
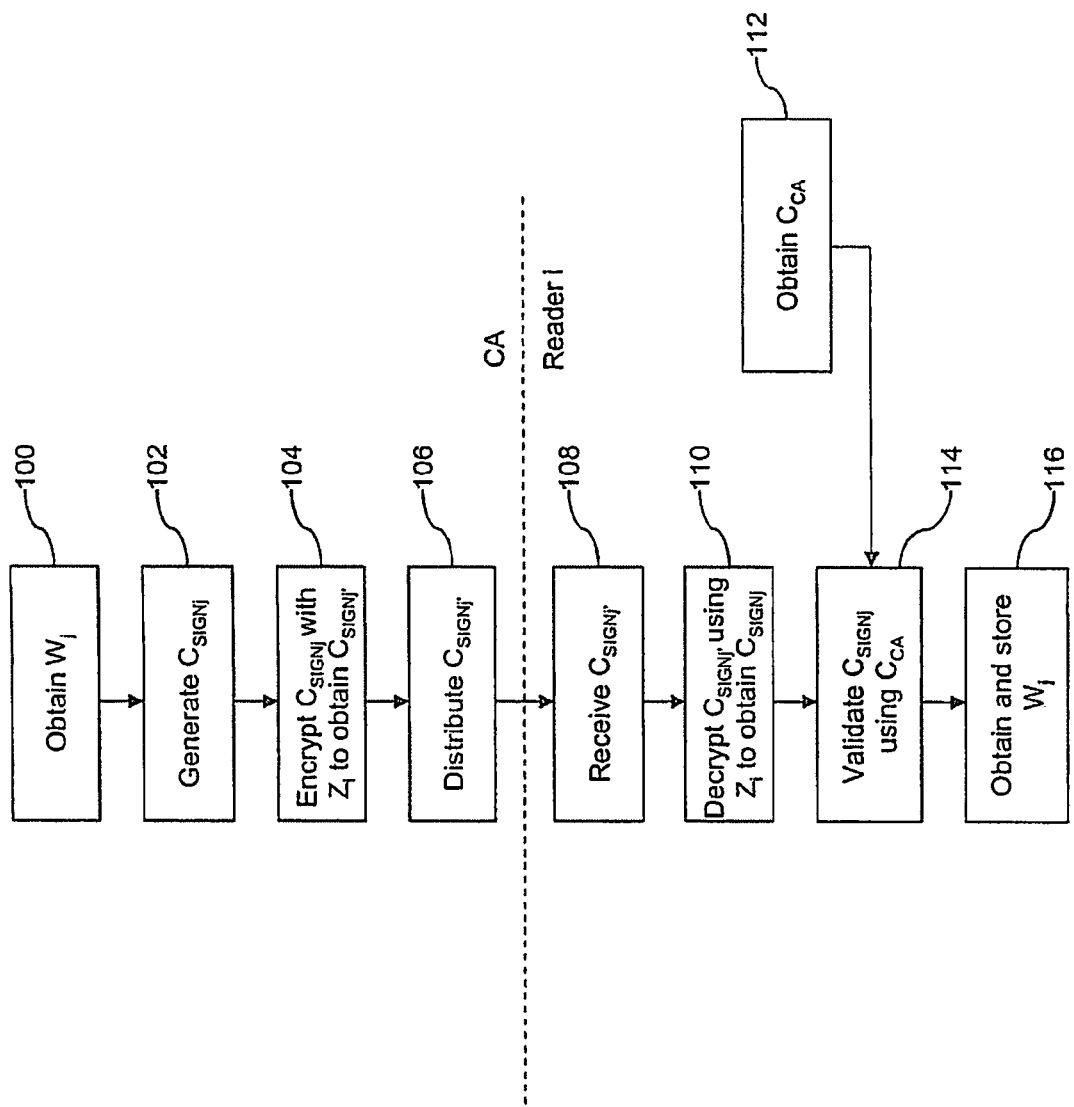
FIG. 6 is a flow diagram illustrating a key distribution procedure.

As a result, taking certain parameters such as the level of acceptable security and the inherent redundancy offered by the ID code 40, a smaller tag 20 may be used, such as a 256 bit RFID tag 20 or a 512 bit tag etc. (not shown) using ECPVS with and without padding.

Where ECPVS is used to hide the product ID 54, the public keys $Z_i$ stored on the readers 14 should be physically protected and the distribution of the keys carefully controlled by, e.g. the CA 12. If each reader 14 contains its own public/private key pair, certificates can be encrypted for each specific reader 14 before distribution. The CA 12 issues certificates for both the signing stations 16 and the readers 14. Key pairs for the readers 14 and signing stations 16 are generated at manufacture time. As discussed above, each reader 14 has a validated list of public keys $W_j$ for the signing stations so that the signatures can be validated. An example key distribution procedure using signer certificates $C_{SIGNj}$ is shown in FIG. 6.

In step 100 the CA 12 obtains the appropriate public key $W_j$ and generates the corresponding certificate $C_{SIGNj}$ at step 102. The certificate is then encrypted using the appropriate public key $Z_i$ for the reader 14 to which the certificate is being distributed at step 104 to obtain an encrypted version $C_{SIGNj}'$. The encrypted version is then distributed to the appropriate reader 14 at step 106, which is received by the reader 14 at step 108. The encrypted version is decrypted by the reader 14 at step 110 using the private key $z_i$ to obtain the original certificate $C_{SIGNj}$. The certificate is evaluated using the CA certificate $C_{CA}$ at step 114 where the CA certificate was obtained at step 112. If valid, the key $W_j$ is obtained from the certificate and stored in the secure key store 36.

Figure 7:
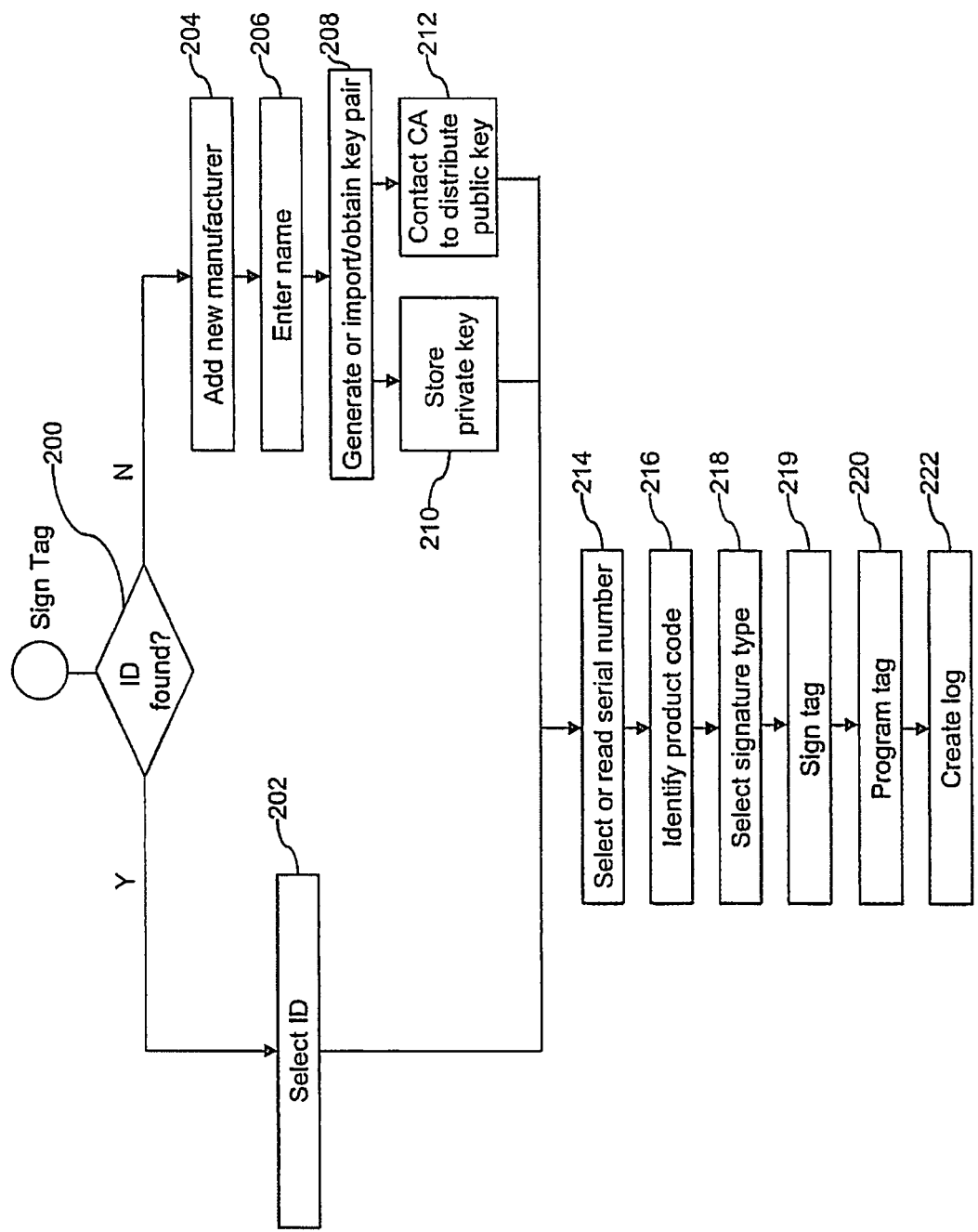
FIG. 7 is a flow diagram illustrating a signing procedure.

A signing operation is shown in FIG. 7 that is applicable to either ECDSA or ECPVS. In the example shown, the signing station 16 first determines if the tag 20 being signed is from a manufacturer that is known to them at step 200. If the manufacturer is known, the manufacturer ID is selected at step 202. If the manufacturer ID is not found, the signing station selects an option to add the manufacturer at step 204 whereby the name is entered at step 206. Typically, the signer is pre-programmed to sign for only a preset number of particular manufacturers and thus steps 200-206 may not be required or may occur automatically without the need for operator intervention. Key pairs for the manufacturer for each type of signature and curve supported are generated, imported or otherwise obtained by the manufacturer at step 208. The private keys are stored in secure hardware at step 210 and the public keys are communicated to the CA 12 at step 212.

The signing station 16 then selects or reads from the tag 20, a serial number at step 214 (may use a default counter value) and a product code is selected at step 216 when applicable (variation (b)). Preferably, the serial number is pre-burned into ROM prior to arrival at the signing/programming facility as discussed above. This enables the manufacturer of the unsigned tag 20 to ensure that in order to compromise the security or attack the system, the hardware would have to be counterfeited rather than simply being able to use a genetic part and program a UID that suits the counterfeiter's purposes.

As noted above, the signing station 16 is typically pre-programmed to automatically generate the proper signature type but in some cases may be programmed to provide the ability for an operator to choose the type of signature to write to the tag (e.g. ECDSA or ECPVS) at step 218, write the signature at step 219, and the tag 20 may then be programmed at step 220. A record is created at step 222 and preferably stored as a log report for tracking and auditing purposes. It will be appreciated that preferably each signing station 16 is pre-programmed such that any decision above is calibrated prior to the signer being deployed. However, if desired, the above-noted decision structures can be offered in a program, e.g. from drop down lists in a graphical user interface (GUI) (not shown). Such a GUI may also be used by a technician for programming and repairing the signing stations 16.

Figure 8:
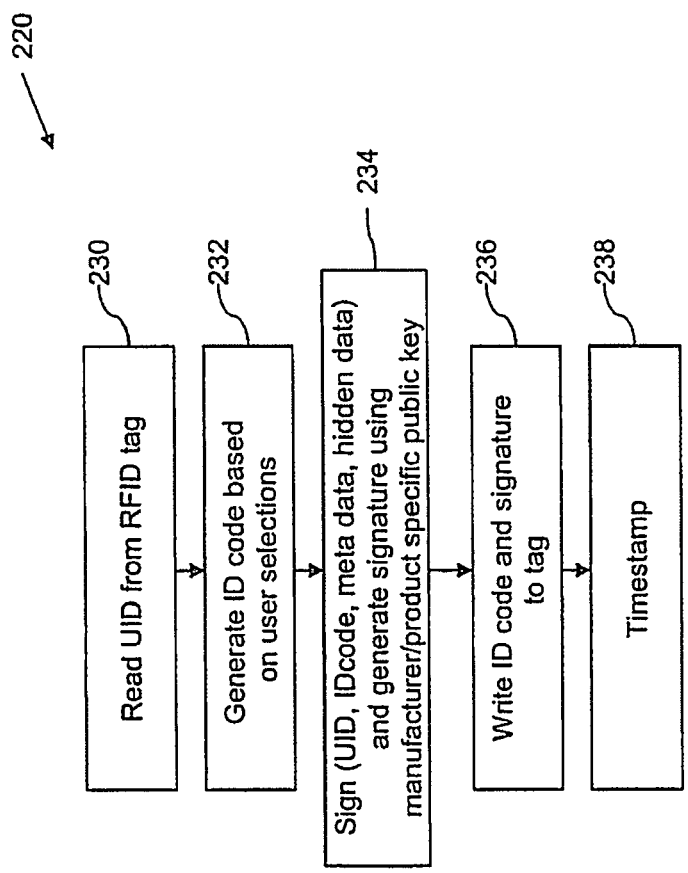
FIG. 8 is a flow diagram illustrating the programming procedure of FIG. 7.

Step 220 is shown in greater detail in FIG. 8. The UID is read from the tag 20 at step 230 and the ID code 40 is generated at step 232 based on user selections, the type of product etc. The UID, ID code, any meta data, and any hidden data (e.g. product ID 54 and using ECPVS) is then signed at step 234 to generate the signature using the manufacturer specific public key. The ID code 40 and the signature are then written to the tag 20 at step 236 and a timestamp is preferably recorded at least in a record internal to the signing station 16 at step 238. If desired, log records and log reports may be stored at the signing stations 16 and then later polled or reported for auditing and tracking purposes.

Figure 9:
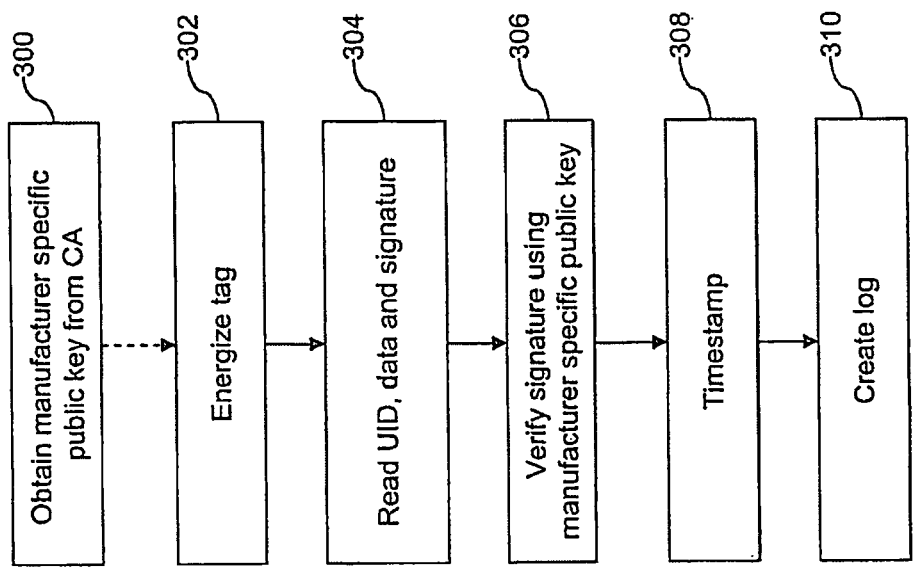
FIG. 9 is a flow diagram illustrating a verification procedure.

A verification procedure is shown in FIG. 9. At some point, the reader 14 obtains the manufacturer specific public key $W_j$ from the CA at step 300. The tag 20 is energized at step 302 when it enters the RF zone 26 (if passive tag) and the UID, data and signature are read by the reader 14 at step 304. The reader 14 then verifies the signature at step 306 using the public key $W_j$ and according to the type of signature scheme being used and a timestamp is recorded if applicable at step 308. A log report is preferably generated at step 310 which can be used for auditing purposes by the appropriate parties responsible for the supply chain and integrity of the product.

It is therefore seen that the read/write times and signature sizes can be reduced in an authenticated RFID system 10 by using ECC and in particular ECPVS and ECDSA when appropriate. The use of ECPVS further adds the benefit of being able to hide a portion of the product information which provides an added incentive to adopting RFID technology. ECPVS also provides the smallest signature at a similar security to an RSA signature. The smaller signature can enable multiple signing stations 16 to be used in the supply chain so that multiple signatures are written sequentially to each tag in the remaining available space and would then need to be verified sequentially. Therefore, it becomes easier to track the life of the product as it moves through the supply chain.

Key Management System for Authenticated RFID System

Figure 10:
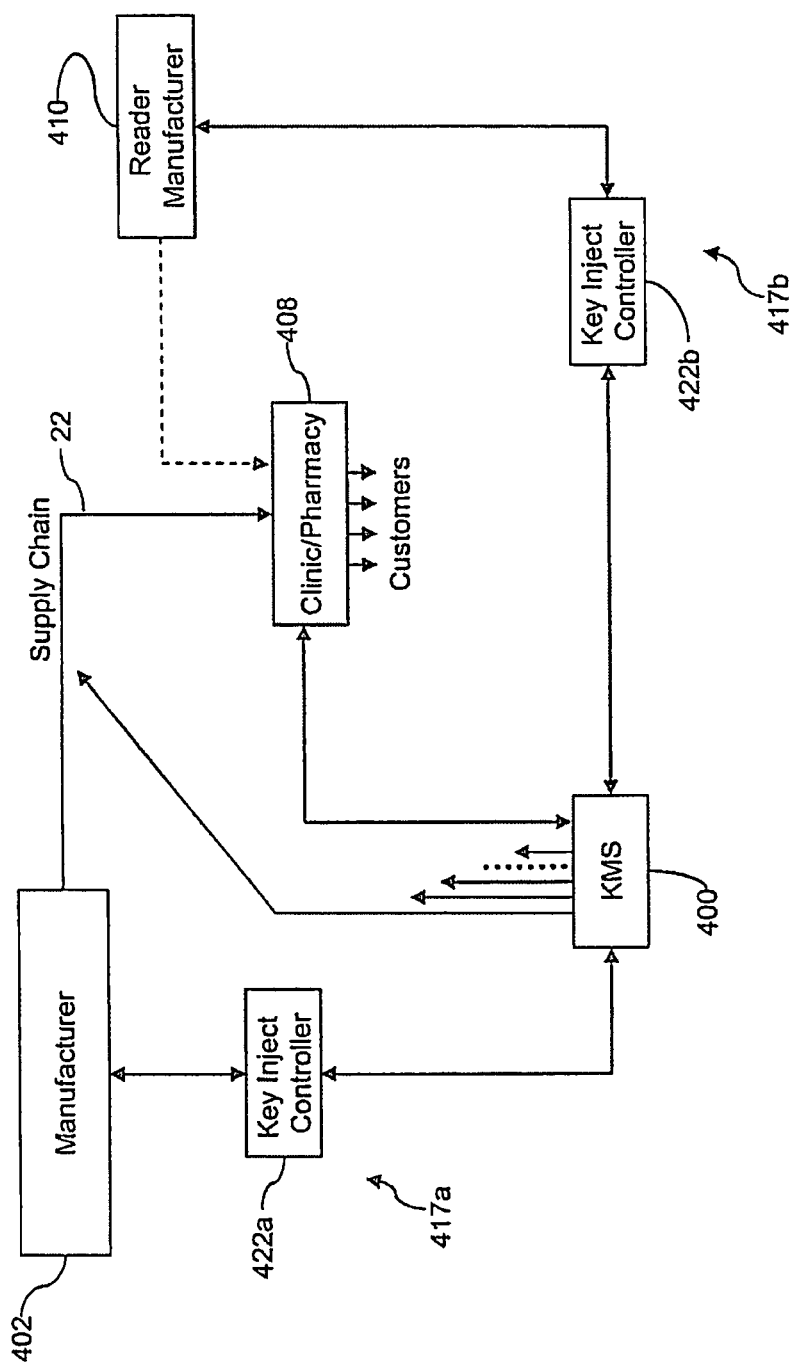
FIG. 10 is a schematic block diagram showing a key management system for distributing keys in an authenticated RFID system and supply chain therefor.

Turning now to FIG. 10, a key management system (KMS) 400 is shown as one embodiment for distributing keys as shown generally in FIG. 2. In the example shown in FIG. 10, the KMS 400 is responsible for managing the distribution of keys in a pharmaceutical manufacturing stage, supply chain 22 and subsequent distribution to customers.

As discussed above, RFID tags 20 that include private or otherwise sensitive information such as a drug or product ID codes 54 can be hidden using ECPV signatures. However, since the hidden portion can be recovered using the public keys $W_{1-T}$ and $Z_{1-N}$ of the signing stations 16 and readers 14 respectively, when the overall system is intended to be distributed and scalable, it is generally preferable to protect the ECPV public keys in a secure manner and to monitor and control distribution thereof. The KMS 400 can be used to control distribution of the ECPV public keys such that only authorized readers 14 can recover the product ID code 54. As such, the keys $W_{1-T}$ and $Z_{1-N}$ in the following example, are to be referred to as "verification keys" given that by imposing such control over the use of these keys, they are not "public" in the traditional sense.

As can be seen in FIG. 10, products 18 that are manufactured (which may include RFID programming, labelling etc.) at a manufacturer 402, can enter a supply chain 22 and eventually end up at a clinic or pharmacy 408 which then distributes the product 18 to customers. The products 18 have affixed thereto, RFID tags 20 which are signed and the signatures read and verified from the tags 20 at various stages in the supply chain 20 and at the point of sale. The clinic or pharmacy 408 thus includes an RFID reader 14, which is programmed and supplied by a reader manufacturer 410. As discussed above, verification of the signed RFID tags 20 requires having up-to-date verification keys, which are distributed, updated, tracked, and otherwise controlled by a central KMS 400. The KMS 400 may utilize key inject controllers 422 to track the number of tags 20 that are signed, the number of readers 14 programmed, and the number of deployed readers 14 that are updated to collect revenue and to protect the distribution of the product 18 and the privacy of the contents. The KMS 400 can be used to distribute the keys and any associated information to the deployed readers 14 in a controlled and authentic manner, which ensures that the ECPV signatures 416 on a tag 20 can only be authenticated by "authorized" readers 14. For example, this can prevent unauthorized readers from obtaining the drug ID code 54 or other confidential information that can otherwise be hidden in the ECPV signature on the passive memory of the RFID tag 20.

Figure 11:
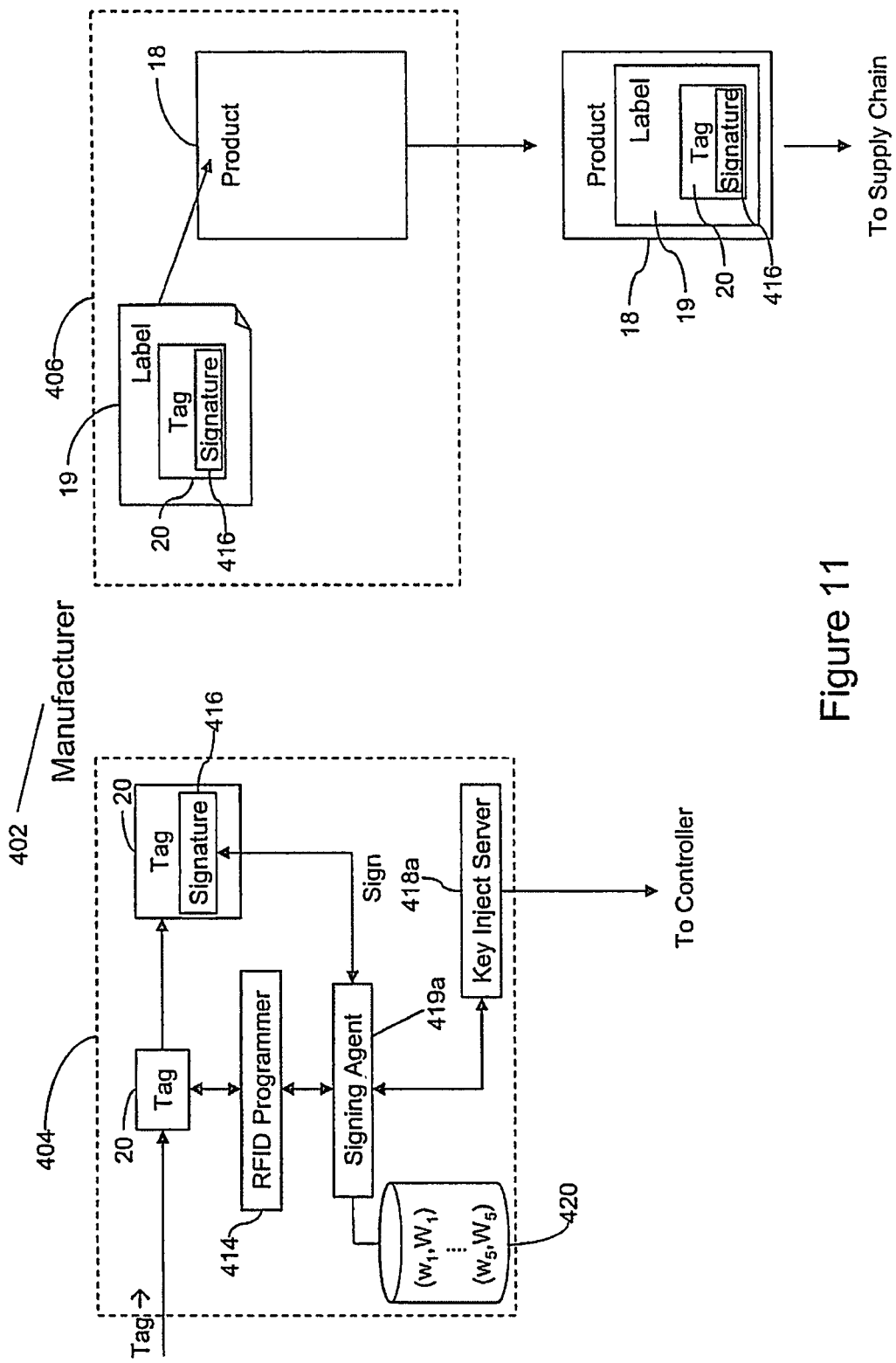
FIG. 11 is a schematic block diagram showing the manufacturing stage of FIG. 10.

As shown in FIG. 11 the manufacturing process implemented by a drug manufacturer 402 in this example includes, in part, an RFID tag programming stage 404 and a pharmaceutical product labelling stage 406. Once the pharmaceutical product 18 is given a label 19, it may then enter a supply chain 22 if applicable to eventually end up at the clinic or pharmacy 408, which in turn distributes (sells) the product 18 to consumers as discussed above.

The tag programming stage 404 generally obtains or receives non-programmed RFID tags 20 (preferably containing a pre-burned serial number or UID), which are programmed using an RFID programmer 414 such that they include, e.g. a product ID code 54 such as an EPCglobal code as shown in FIG. 5. In this example, a digital signature 416, e.g. an ECPV signature, is written to the tag 20 by the RFID programmer 414. The RFID programmer 414 preferably interfaces and is at least partially controlled by a key injection system 417a, which includes a signing agent 419a, a key inject server 418a (which in this example resides at the same site as the programming stage 404), and a key inject controller 422a (which is typically an external entity that communicates securely with the key inject server 418a). The RFID programmer 414 in this example interfaces directly with the signing agent 419a to obtain the necessary information in order to prepare and write a signature 416 to the tag 20.

In general, the key inject system 417 is a system that is used to remotely monitor device registration and, if required, to meter the injection of unique and immutable information into the device. A complete description of the key injection system 417 is provided in co-pending U.S. patent application Ser. No. 11/450,418 filed on Jun. 12, 2006, the contents of which are incorporated herein by reference. In the present example, the controller 422a is a computer system that is remote to the RFID programming facility but is preferably under control of the company that produces the drug.

The key inject server 418a, signing agent 419a, and the RFID programmer 414 may or may not be in the same location or building. Preferably, a secure connection is established over a network connecting the components of the key inject system 417a internally and/or externally. The signing agent 419a comprises a data storage device 420, preferably in a hardware security module, which is a protected device used by the signing agent 419a to perform cryptographically secure operations such as encryption, decryption and signing and to store sensitive data.

The storage device 420 stores a key pair $(w_j, W_j)$ for each product type (e.g. for each drug). In this example, the drug manufacturer 402 is responsible for writing signatures 416 for five (5) different products and thus stores five key pairs as shown in FIG. 11. It will be appreciated that the data storage device 420 may be accessed by multiple RFID programmers 414 on multiple product lines in the same facility, or distributed in different buildings. As such, any number of key inject systems 417a, data storage devices 420 and RFID programmers 414 can be used depending on the logistics of the manufacturing process. For simplicity, the present example illustrates five product lines in the same facility that use a common key inject system 417 having a single RFID programmer 414 that is configured to write signatures 416 using any of the key pairs ($w_j$, $W_j$) appropriate to the product. It will be appreciated that a key inject system 417a is only one way to distribute keys and any other configuration that enables the KMS 400 to monitor and control such a process may be used. As such, the KMS 400, in general, can be thought of as a controller for distributing the keys, which may make use of any applicable sub-systems for interacting with the various parties involved in the overall authenticated RFID system.

The signature 416 is generated by signing the tag 20 using the serial number, a drug ID code 54 specific to the product 18, and other supply chain 22 specific meta data using the private key for that product 18. The signature 416 is preferably an ECPV signature written to the tag 20 as described above.

As can also be seen in FIG. 11, the labelling stage 406 applies the programmed RFID tag 20 (which includes the signature 416) to a label 19, and in turn applies the label 19 to the product 18. It can be appreciated that the labelling stage 406 may also be integrated with the RFID programming stage 404 and, similarly, may be at the same facility. Again, the nature of the manufacturing process is dependent on the product 18, the requirements of the industry etc. and FIG. 11 is only an illustrative arrangement. In this example, a labelling machine (not shown may be used and could interface with the key inject system 417a if desired or if a signature is to be added at the labelling stage 406.

Once the products 18 are labelled, they may then enter the supply chain 22, which may include steps of shipping, warehousing, distribution etc. As will be discussed below, additional signatures 416 may be added to the tag 20 and/or the signature 416 may be verified by RFID readers 14 at any one or all of the supply chain stages.

Figure 14:
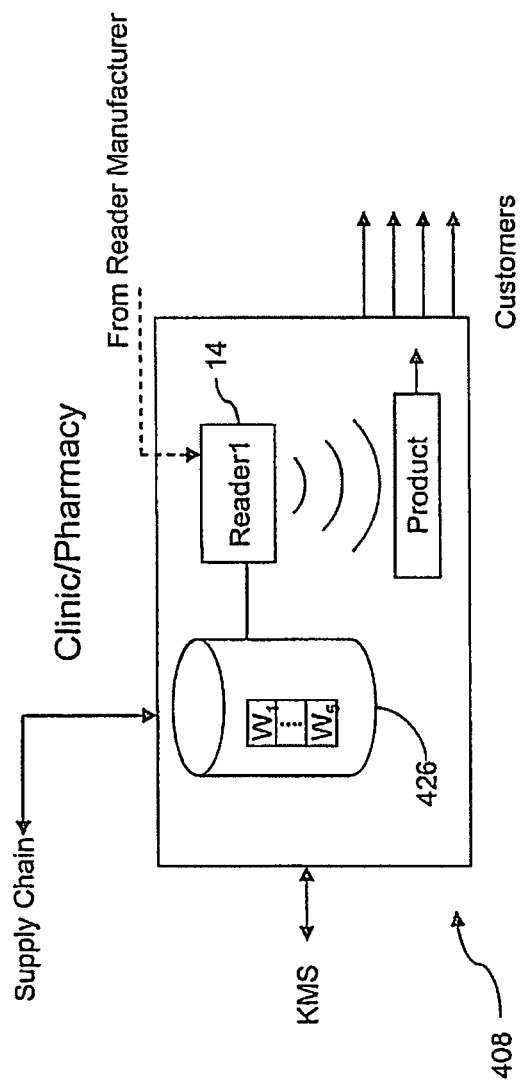
FIG. 14 is a schematic block diagram showing the clinic/pharmacy of FIG. 10.

The product 18, in this case a drug, eventually arrives at one or more clinics or pharmacies 408, shown in more detail in FIG. 14, which is then responsible for distributing the drug 18 to consumers. Each clinic or pharmacy 408 includes a reader 14 that includes an up-to-date set of keys, which are stored locally, preferably in secure hardware, in a data storage device 426. As shown generally in FIG. 2, the reader 14 stores its own key pair, in this case, it being reader 1, key pair ($z_1$, $Z_1$); a copy of the corresponding certificate $C_{VER1}$; a copy of the CA's certificate $C_{CA}$; and the verification keys of which it has permission to use (e.g. keys $W_{1-5}$). The verification keys are provided on a conditional basis by the KMS 400 as will be explained below.

Figure 12:
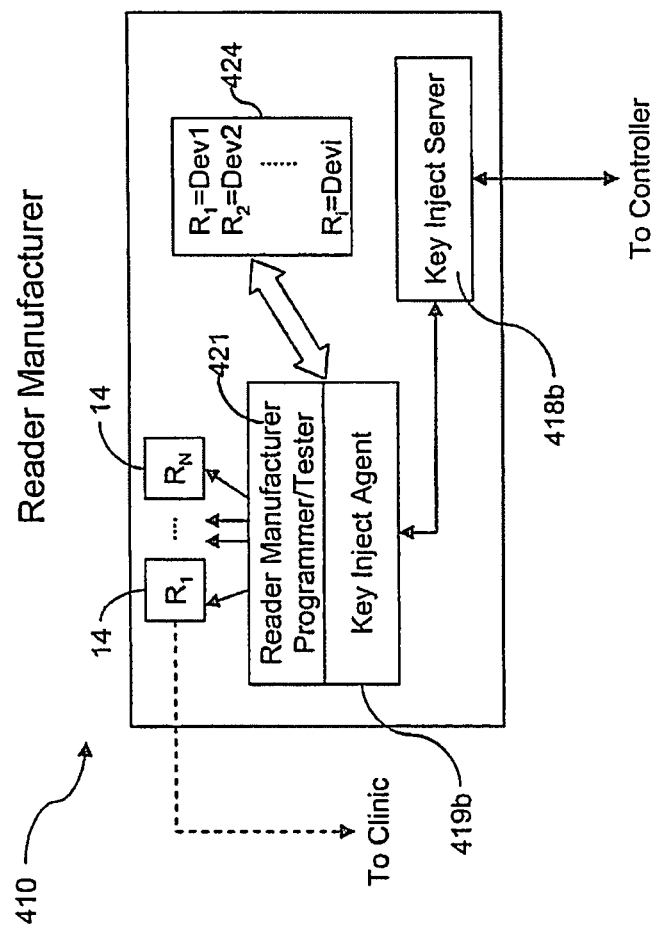
FIG. 12 is a schematic block diagram showing the reader manufacturer of FIG. 10.

Each reader 14 is programmed at the reader manufacturer 410, shown in FIG. 12, which also uses a key inject system 417 to create the key pairs ($z_i$, $Z_i$) and to assign a device identifier $Dev_i$ to each reader 14 for identification purposes. The reader manufacturer 410 includes a database 424 that records the device identifiers for the KMS 400. A reader manufacturer reader/programmer 421 interfaces with another key inject agent 419b, which in turn communicates with another key inject server 418b to track the programming of the readers 14. In this way, as each reader 14 is given a new key pair, the key inject server 418b can communicate the new keys back to the KMS 400 via another key inject controller 422b and track revenue for such an operation.

Figure 13:
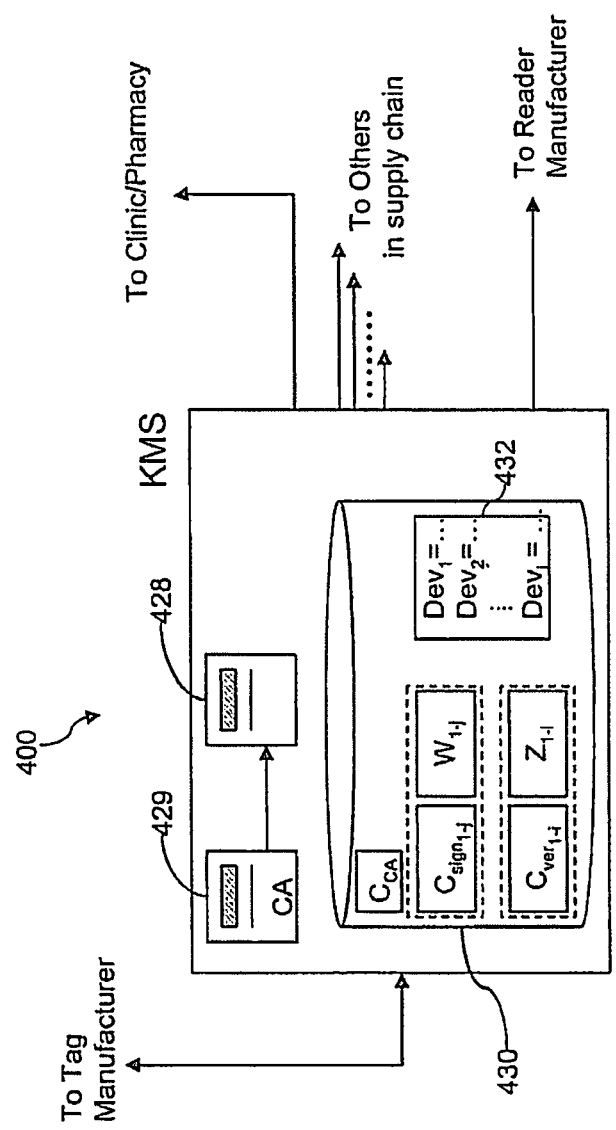
FIG. 13 is a schematic block diagram showing the KMS of FIG. 10.

As shown in FIG. 13, the KMS 400 includes a CA 429, a certificate server 428, and a conditional access database 430 and allows the readers 14 in the field to obtain up-to-date certificates for the signing stations 16. These certificates can then be used by the readers 14 to verify the digital signatures 416 generated by the key inject agents 418 at the signing station 16.

New key pairs ($w_j$, $W_j$) for the signing stations 16 can be generated in a number of ways. For example, the key pairs may be generated in a secure environment by approved personnel and then uploaded to the signing stations 16 when appropriate. In another embodiment, the key pairs can be automatically generated by the signing agent 419 or key inject server 418. In yet another embodiment, the key pairs can be generated by the key inject controller 422 or the KMS 400 (i.e. from a remote location) and then securely transmitted or uploaded to the signing station 16 (i.e. through the key inject server 418 and agent 419). A new key pair ($w_j$, $W_j$) is required each time that a new signing station 16 is deployed or when it is desirable for an existing signing station 16 to use multiple keys (e.g. for different product lines). If the signing station 16 generates a new key pair, a certificate request may be created, which contains the public key signed with the private key. The certificate request is then transmitted back to the KMS 400, which in this example is done through the key inject controller 422a. By using the key inject controller 422a, the KMS 400 is not only able to keep up to date key information, but use of the key inject controller 422a also enables the KMS 400 to inhibit fraudulent attempts to create new manufacturing lines without the proper consent. The KMS 400 is therefore able to track and obtain revenue for each tag 20 that is signed, for each product line that is properly registered.

The KMS 400 can also track the number of readers 14 that are programmed using the other key inject controller 422b. In this way, the KMS 400 can ensure that it is aware of all readers 14 that are capable of (and have permission for) verifying the signatures 416 signed by the signing stations 16. Where at least a portion of the recoverable contents of the signature 416 is sensitive or private information, this enables the KMS 400 to have greater confidence in the security and privacy of the overall system.

The KMS 400 may similarly track each signature verification or additional signature write operation that occurs as the tag 20 passes through the supply chain 22. The KMS 400 therefore not only securely distributes keys to the appropriate entities, but can also track points of revenue for the key distribution service. For example, the KMS 400 can track the number of tags 20 signed, and the number of readers 14 programmed and collect a per-device or per-tag charge. The KMS 400 may also track reader usage at the clinic or pharmacy 408 and collect a monthly or flat rate service fee for synchronizing the deployed readers 14 with up to date keys. The clinic or pharmacy 408 and the manufacturer 402 can, in turn, offer security and privacy to their customers and/or business partners.

Figure 15:
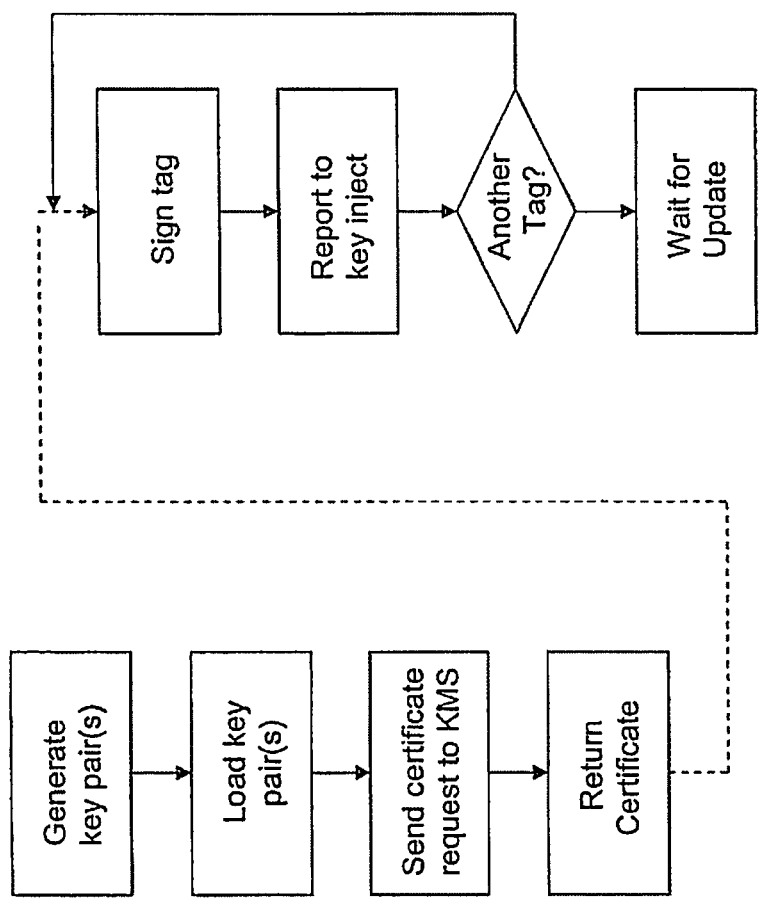
FIG. 15 is a flow chart illustrating key generation and tag signing process.

Referring now to FIG. 15, processes for generating new keys for the signing station 16 and for signing tags 20 are generally shown. As noted above, a new key pair ($w_j$, $W_j$) can be generated in a secure environment and then loaded manually into the signing agent 419a, or can be generated and loaded by the KMS 400 and/or key inject system 417a. Once the new key pair has been generated and loaded at the signing station 16 (e.g. manufacturer 402), the key agent 419a then generates and sends a certificate request to the KMS 400, e.g. through the key inject system 417a. It should be noted that the system shown in FIGS. 10-14 does not require that the signing stations 16 and readers 14 be online at all times. As such, the certificate requests may be sent to the CA 429 at a later time by the key inject server 418a, e.g. by way of an email or other form of communication, together with the business request to add a certificate to the KMS 400.

The business request typically includes the parameters of the business relationship between the KMS 400 and the manufacturer 402. For example, there may be an agreement for a per-signature charge that can be collected by the KMS 400 for keeping the manufacturer 402 up to date with current and valid keys for generating the signatures. Other agreements such as flat rate monthly fees, one time fees etc. may also be established depending on the nature of the manufacturing environment, the product 18, volumes, price per unit etc.

Once the business agreements have been processed by the KMS 400, the KMS 400 then issues and returns a certificate $C_{SIGNj}$, which corresponds to the key pair generated. The certificate is placed on the certificate server 428, together with a list of readers 14 that are entitled to the certificate. Therefore, it can be appreciated that the business request also typically includes details of preferred or mandatory distributors and/or parties in the supply chain 22. This enables the KMS 400 to track permissions for the readers 14 and to update their keys accordingly. The certificate $C_{SIGNj}$ is also stored by the signing station 16 for future reference as discussed above. It may be noted that the signing station 16 does not necessarily make use of the certificate in normal operations.

Once the signing agent 419a has been provisioned with one or more keys, which correspond to one or more products 18 on one or more product lines, tags 20 may then be signed during the programming stage 404. The key inject system 417a may be used to meter a credit pool to restrict the number of tags 20 that are signed or may instead simply track the number of tags 20 that are signed by using a secure reporting process. For example, after signing a tag 20 as shown in FIG. 15, the signing agent 419a then reports back to the signing server 418a indicating that a tag 20 has been signed, which is repeated for each tag 20 in the particular run or shift, and then the signing agent waits 419a for its next instructions, updates or batch of tags 20. The server 418a may then report the total number of signed tags to the KMS 400 through the key inject controller 422a at the appropriate time. Alternatively, the signing agent 419a may track the number of tags signed and then report the total to the server 418a who in turn reports back to the KMS 400 through the controller 422a. The key inject system 417a can not only track tag signing but also meter a credit pool to restrict the number of tags 20 signed in a particular amount of time and/or for a particular manufacturer 402 or product line etc.

Figure 16:
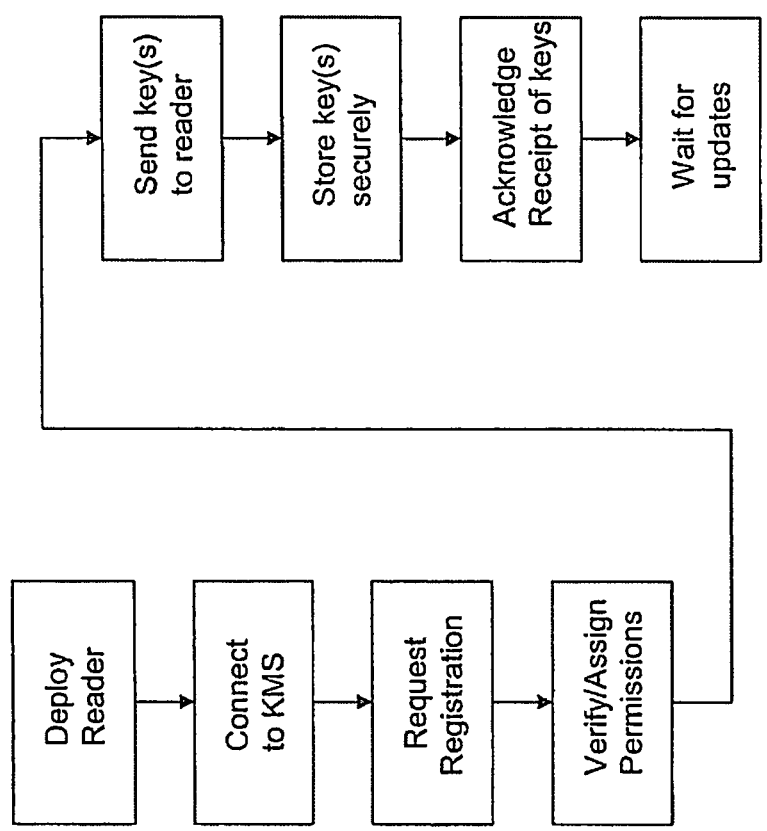
FIG. 16 is a flow chart illustrating reader registration process.

Referring now to FIG. 16, a process for registering a reader 14 is shown. The reader 14 is first manufactured at the reader manufacturer 410, which includes the creation of a reader key pair $(z_i, Z_i)$. The reader 14 generates a certificate request, sends the certificate request to the KMS 400 through the key inject system 417b, and is issued a corresponding certificate $C_{VERi}$. The reader 14 may then be deployed to a clinic or pharmacy 408 or a particular stage in the supply chain 22. The reader 14, once deployed, then connects to the KMS 400 through the key inject system 417b to request for registration. The KMS 400 determines which, if any, keys the particular owner of that reader 14 are entitled to, and verifies the request. If verified, the KMS 400 then assigns and records a set of permissions to the reader 14. The KMS 400 sends an indication of these permissions with the associated verification keys $W_j$ to the reader 14 and meta data may be appended at this point. The reader 14 then securely stores the keys, preferably in a hardware security module (HSM) and acknowledges receipt of the keys to the KMS 400. The reader 14 may then use the verification keys according to its permissions, to verify signatures 416 on the tags 20 as product 18 is sold.

The reader 14 in the meantime waits for updates from the KMS 400 since some of the keys may expire after a prescribed amount of time and new products 18 may need to be verified. The KMS 400 is able to update the reader 14 based on the feedback it obtains from the signing stations 16 (e.g. manufacturers 402) and based on product information, privacy issues etc.

Figure 17:
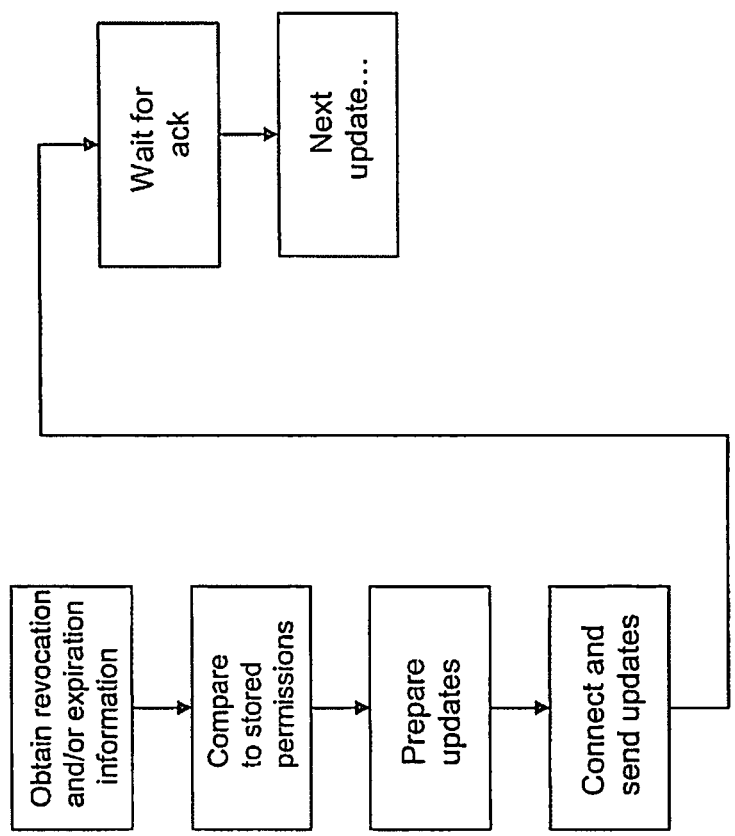
FIG. 17 is a flow chart illustrating a key distribution process.

Referring now to FIG. 17, a process for updating the readers 14 is shown. The KMS 400 first obtains or gathers information regarding revocation of certificates, expiration of products and any other information that affects the validity of the product 18 and keys $W_j$ that are used to verify the corresponding signature 416. This information is compared to the locally stored information regarding the permissions that have been assigned to certain readers 14, and updates are prepared for each reader 14. The KMS 400, when a connection is available (or using a polling or other scheduled routine), connects to the readers 14 and then sends the updates, waits for acknowledgement that the reader 14 has been updated and then disconnects until the next updates are required and/or available.

It can be seen that the KMS 400 can operate in a semi-online manner and thus the readers 14 and signing stations 16 do not require a dedicated connection that is always online. The KMS 400 can update at appropriate times or have scheduled updates that require a connection to be established. It will be appreciated that where possible, a fully online system may also be used and/or a closed loop system within a single entity depending on the nature of the manufacturing environment and the supply chain 22 and distribution channels.

Figure 18:
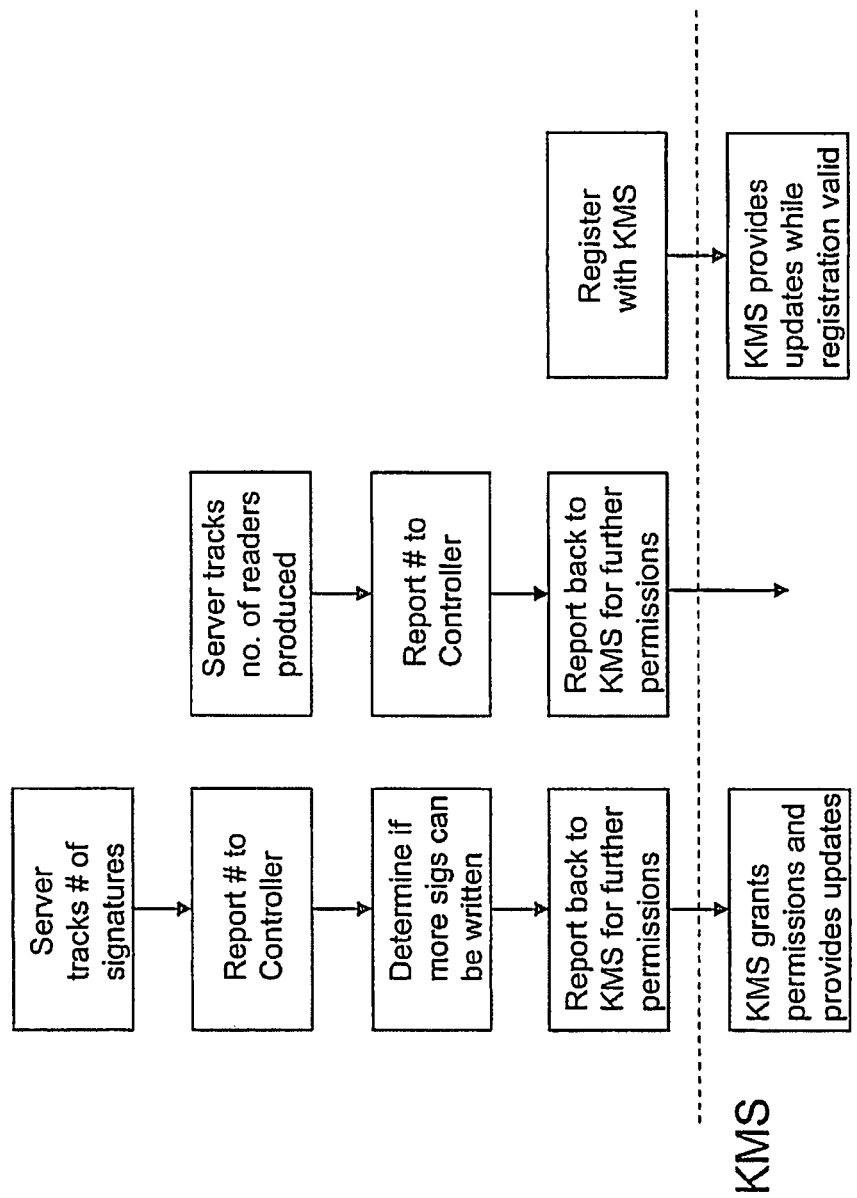
FIG. 18 is a flow chart illustrating a revenue tracking process.

FIG. 18 illustrates an exemplary revenue flow to enable a KMS 400 to track and collect per use and flat charges for keeping up to date keys. For example, on the signature end, the key inject server 418a can be used to track the number of signatures written, report this number to the controller 422a, which then, if necessary, determines if more signatures can be written etc. (metering) and reports back to the KMS 400 for further "credit" or to simply report the revenue that should be collected from the particular manufacturer 402. The server 418a can be used to track multiple signing agents 419a on multiple product lines to prepare a consolidated revenue report for the KMS 400. The controller 422a is preferably responsible for managing credits and updating credit pools (and relaying this information to the KMS 400) with the KMS 400 overseeing operation of the controllers 422 (e.g. using log reports). However, the KMS 400 may also grant further credit if appropriate, may prepare updates while a connection is established, and then would able to directly collect revenue from the manufacturer 402 for the signatures 416 that have been written. The revenue is, as noted above, dictated by the corresponding business requirements and arrangements. For example, the KMS 400 may be paid in advance for a predetermined number of signatures 416 and thereafter obtain additional revenue for individual signatures.

For the reader manufacturer 410, the KMS 400 may charge per reader 14 that is produced, which is tracked by the key inject server 418b and controller 422b and repotted back to the KMS 400 for billing and tracking needs. Once the readers 14 are deployed, the KMS 400 preferably provides a key update in exchange for a regular service fee. It will be appreciated that, although more difficult to track every read performed by each reader, e.g. due to missed reads etc., the KMS 400 can also charge per read. It will also be appreciated that similar revenue streams can be tracked and acquired through the various other stages in the supply chain 22 depending on the nature of the involvement of the other entities.

Aggregate Signatures for Multiple Signers

If the number of signers is large so too is the number of signatures and where the amount of space for storing the signatures is limited or at a premium (e.g. RFID tags 20), then the combined size of all the signatures can be costly. The following signature schemes reduce the size of multiple signatures by aggregating one or more signature components. The following schemes improve on traditional multi-signature schemes that compress two or more signatures.

Although particularly suitable for incorporating a contribution from multiple signing entities in an RFID signing scheme as discussed and exemplified herein, it will be appreciated that the signature schemes discussed below are applicable to any environment.

In one implementation the following aggregate signature schemes can be used with multiple signing stations (e.g. with RFID tags 20 in a pharmaceutical supply chain).

Traditionally, aggregate signatures have been proposed based on a digital signature algorithm using bilinear pairings. The algorithm defines an aggregate signature scheme, which is a traditional signature scheme equipped with two additional operations. The first operation takes a set of signatures $S_1, S_2, \ldots, S_t$ of messages $m_1, m_2, \ldots, m_t$ signed by t users with public keys $U_1, \ldots, U_t$, and aggregates these into a single compressed signature s. The second operation verifies an aggregate signature s, given the messages $m_1, \ldots, m_t$ and the users' public keys $U_1, \ldots, U_t$. The signature s is valid if and only if every one of the $s_i$ verifies for the associated message and user.

The following is particularly useful for ECPVS signatures although is equally applicable to other ElGamal signatures and similarly to other schemes such as ECDSA as will also be shown below.

When referring to ECPVS and ECDSA signature schemes, the terminology used above is repeated for consistency.

According to the above examples, it is assumed that there are T signers 16 that are each to sign a message M. For simplicity, it is also assumed that M is identical for all signers and, when signed using ECPVS, the recoverable portion H and visible portion V are also the same, e.g. the product ID and UID respectively. It will be appreciated that in some cases, V will be different for each signer j, i.e. $V_j$. It is also considered below that each signer may instead sign a different recoverable message $H_j$.

The following describes two types of aggregation, namely a semi-aggregate signature scheme and a fully-aggregate signature scheme. It has been found that the semi-aggregate signature scheme can compress the signatures to two-thirds of the original size. The fully-aggregate signature scheme is named as such since the compressed aggregate signature is the size of a single signature, no matter how many signing stations 16 are involved. The rate of compression is T-fold when there are T signers, and thus the fully-aggregate signature scheme can reach very high rates of compression when there are many signers.

Although full aggregation has better compression than semi-aggregation, it requires the co-operation of the signers to create the aggregate signature and thus may not be suitable where the signers are in different locations. Also, in other circumstances, e.g. where parties sign at different times, full aggregation may not be possible. The semi-aggregate signatures, discussed below, however, enable asynchronous signing and thus can be used instead of full-aggregation when necessary.

Semi-Aggregate ECPVS

The semi-aggregate signature scheme using ECPVS for T signers begins with a first signer, namely Signer 1, computing a traditional ECPVS signature $(c_1, s_1)$ by encrypting a hidden portion H in $c_1$. Signer 2 then encrypts $c_1$ when computing $c_2$ rather than encrypting H, and then computes the other component $s_2$ in the normal fashion, producing an updated signature $(c_2, s_1, s_2)$. This is repeated for each signer, until signer T encrypts $c_{T-1}$ when computing $c_T$ and the semi-aggregate signature is $(c_T, s_1, \ldots, s_T)$. In other words, each signer encrypts the previous "c" component whilst generating then next "s" component using the updated "c" component.

To verify the semi-aggregate ECPVS signature, a verifier 14 (e.g. RFID reader) first recovers $c_{T-1}$ by performing an ECPVS verification on components $(c_T, s_T)$ to decrypt $c_{T-1}$ from $c_T$. Next, the verifier recovers $c_{T-2}$ from $(c_{T-1}, s_{T-1})$ and this is repeated until representation H' of H is recovered. H' is then checked for a particular characteristic, such as redundancy and, if the characteristic is present, message M can be reconstructed using H' and V.

The semi-aggregate method is named as such for two reasons. First, the intermediate ciphertexts $c_1, \ldots, c_{T-1}$ do not need to be included in the final ciphertext $c_T$. Second, the verifier 14 has defended the acceptance or rejection of the intermediate signature(s) until all ciphertexts have been decrypted. For example, it is not necessary for signers 2 to T to add any redundancy. Therefore, the extra signers only add message expansion by adding the values $S_2, \ldots, s_T$.

Figure 19:
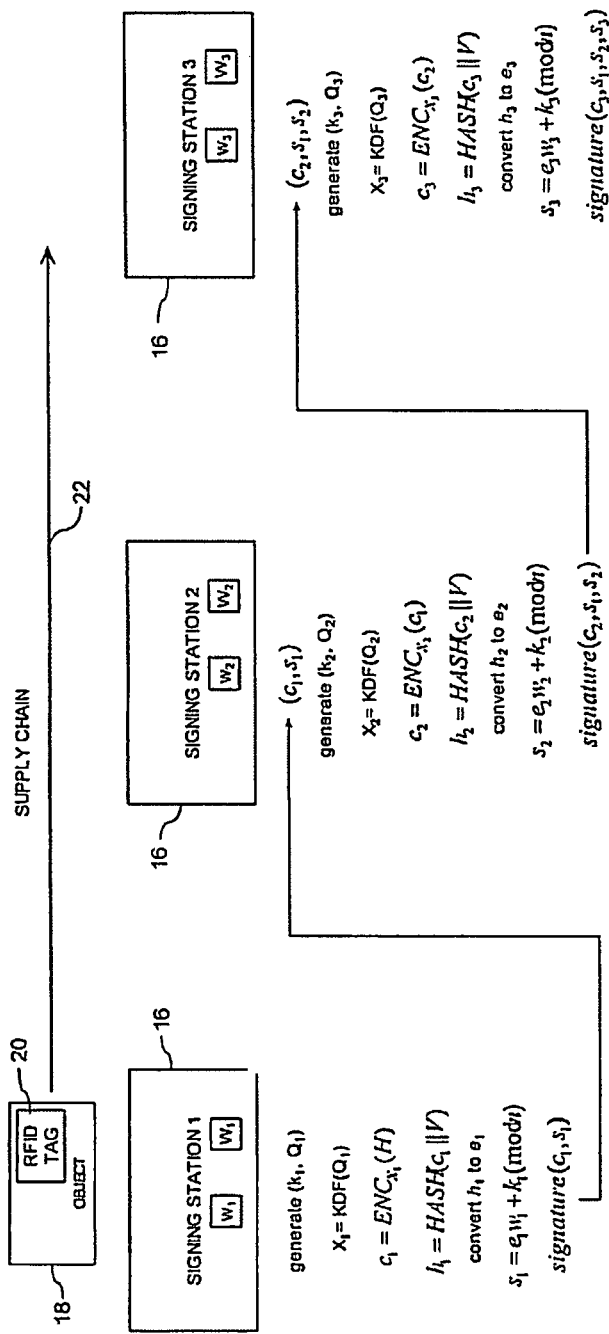
FIG. 19 is a schematic block diagram showing a semi-aggregate signature generation scheme.
Figure 20:
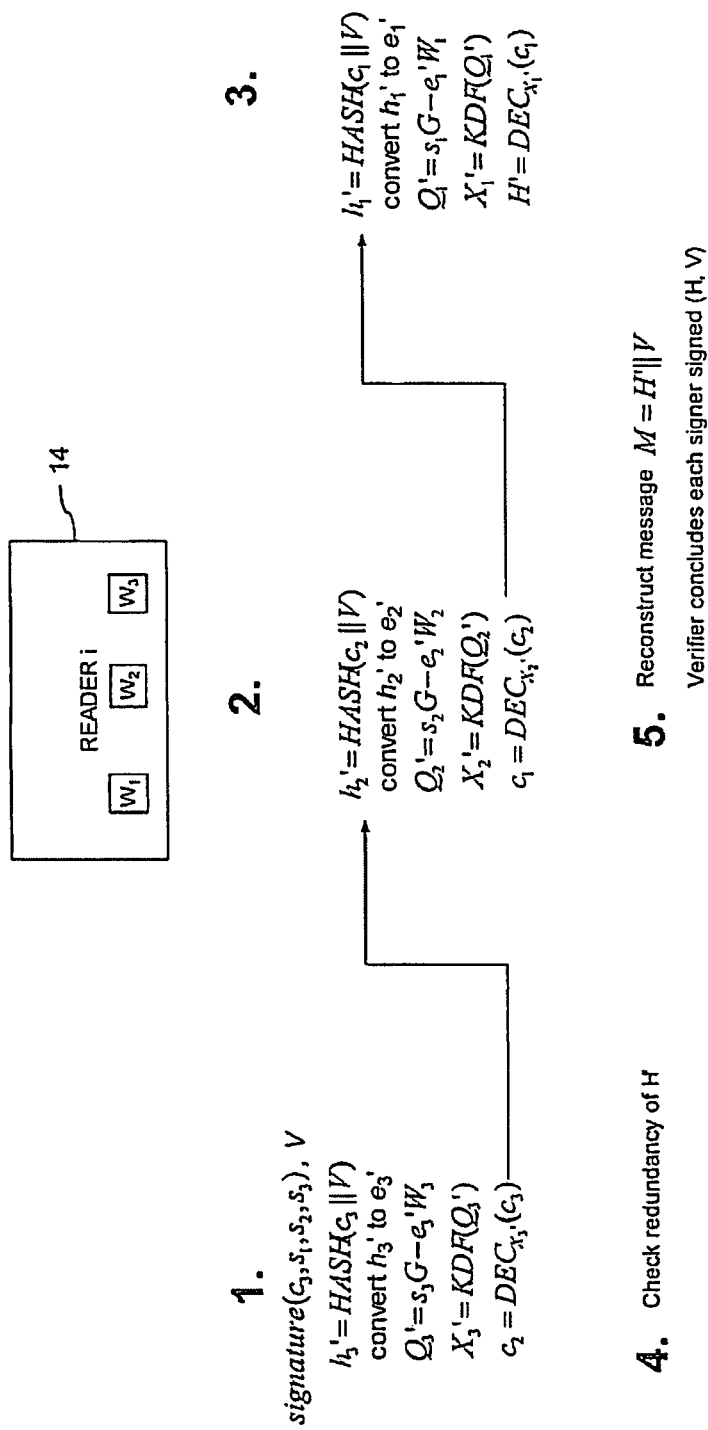
FIG. 20 is a schematic block diagram showing a semi-aggregate signature verification scheme.

To further illustrate the semi-aggregate signature scheme, the following example is provided for three signers, making reference to FIGS. 19 and 20. The following example is particularly applicable to a pharmaceutical supply chain having three signing stations 16 in the supply chain 22 that each contribute to the signature added to an RFID tag 20 affixed to an object 18 (see also FIG. 1). It will be appreciated that the semi-aggregate signature scheme can be used to provide multiple signatures in any environment and should not be limited to RFID systems.

As shown in FIG. 19, Signing Station 1 generates an ephemeral key pair $(k_1, Q_1)$ and then generates an encryption key $X_1 = KDF(Q_1)$ as described above. A first signature component for the first signer $c_1$ is then computed by encrypting the recoverable part H of the message M using the key $X_1$ while, in this example, ensuring sufficient redundancy in H exists for later verification. Using the visible portion V of the message M, an intermediate component $h_1$ is then computed using a hash function (e.g. SHA1) and converted to an integer $e_1$, which is then used along with the private key $w_1$ of Signing Station 1 and the ephemeral key $k_1$ to generate the second signature component $s_1$ for the first signer. In this example, the signature having components $(c_1, s_1)$ is then written to the RFID tag 20 as usual in ECPVS.

A second signing station, Signing Station 2, then contributes to creating an updated, semi-aggregate signature rather then adding a separate signature. In this example, Signing Station 2 is at another point in the supply chain. Similar to Signing Station 1, Signing Station 2 generates an ephemeral key pair $(k_2, Q_2)$ and an encryption key $X_2 = KDF(Q_1)$. However, at this stage, Signing Station 2 encrypts the existing signature component $c_1$ using $X_2$ to generate signature component $c_2$. Intermediate signature component $h_2$, integer $e_2$ and signature component $s_2$ are computed as before, however, the resultant updated signature now comprises the set of components $(c_2, s_1, s_2)$. As such, signature component $c_1$ is encrypted in $c_2$ and the "s" components (i.e. $s_1, s_2$ at this stage) are kept in the updated signature.

A third signing station, Signing Station 3, in this example the final signing stage, also contributes to the semi-aggregate signature, which currently comprises $(c_2, s_1, s_2)$ oil the RFID tag 20. Similar to the previous signing stations 16, Signing Station 3 generates its own encryption key, in this case $k_3$, and then encrypts signature component $c_2$ using $k_3$ to generate an updated "c" signature component $C_3$. Intermediate component $h_3$, integer $e_3$, and component $s_3$ are computed as described above, and the resultant updated (and in this example final) signature comprises components $(c_3, s_1, S_2, S_3)$.

At each stage, the new signature that embeds the "c" component of the previous signer 16, is written over the previous form of the semi-aggregate signature. Therefore, the semi-aggregate signature $(c_T, s_1, \ldots, s_T)$ is smaller than writing individual signatures $((c_1, s_1), \ldots, (c_T, s_T))$ to the RFID tag 20.

Referring now to FIG. 20, verification of the semi-aggregate signature in general includes a stage for each signing stage and in this example, the RFID tag 20 includes a signature having components $(c_3, s_1, s_2, s_3)$ and the visible portion V of the message M (e.g. UID).

In stage 1, the verifier 14 computes $h_3'$ using component $c_3$ and the visible portion V, converts $h_3'$ to an integer $e_3'$, computes $Q_3'$ using $s_3$, $e_3'$ and the public key $W_3$ of Signing Station 3, and then generates $X_3'$ by applying the same KDF to $Q_3'$. The verifier 14 then obtains $c_2$ by decrypting $c_3$ using $X_3'$ and a complementary decryption function, e.g. that denoted by "DEC" in FIG. 20.

Now that the verifier has obtained $c_2$, in stage 2, the verifier computes $h_2'$ using component $c_2$ and the visible portion V, converts $h_2'$ to an integer $e_2'$, computes $Q_2'$ using $s_2$, $e_2'$ and the public key $W_2$ of Signing Station 2, and then generates $X_2'$ by applying the same KDF to $Q_2'$. The verifier then obtains $c_1$ by decrypting $c_2$ using $X_2'$ and a complementary decryption function.

In stage 3, the verifier computes $h_1'$ using component $c_1$ and the visible portion V, converts $h_1'$ to an integer $e_1'$, computes $Q_1'$ using $s_1$, $e_1'$ and the public key $W_1$ of Signing Station 1, and then generates $X_1'$ by applying the same KDF to $Q_1'$. Since $c_1$ was generated by encrypting the recoverable portion of the message H, a bit string H', which is a representation of H is then obtained by decrypting $c_1$ using $X_1'$. At stage 4, the verifier 14 then checks for the expected characteristic such as the redundancy of H' in this example and, if sufficient, accepts H' as the recoverable portion H and can reconstruct the message M, e.g. by combining H' and V at stage 5. The verifier 14 may then conclude that each signer signed the message M represented by components (H,V).

It should be noted that although in this example, each signer 16 operates on the same visible portion V, the visible portion V may alternatively vary as $V_i$ for each signer 16. In this alternative, each intermediate component h' would be computed using the respective visible portion $V_i$ and the verifier 14 would perform each verification stage using the same respective visible portion $V_i$. The above example using the sane visible portion V was provided for the sake of simplicity.

It can be seen that with the above semi-aggregate signature method, each additional signer 16, after the first signer 16 (e.g. Signing Station 1), at an 80 bit security level, each contributes approximately 160 bits of message expansion, which is the bit size of n and $s_i$ at the security level of 80 bits. At 128 bits of security, the relatively marginal message expansion per signer would be approximately 256 bits. As such, the semi-aggregate signature method is particularly suitable for having multiple signing entities contribute to a signature thus enabling a verifier to ensure that, e.g., an RFID tag was handled by the expected participants in the supply chain. It will be appreciated that the semi-aggregate signature scheme provides similar advantages to any environment where storage or bandwidth or both are at a premium.

Semi-Aggregate Signatures—Variations

Variations on the above-described semi-aggregate method are possible. For example, each signer could add a small amount of redundancy at each signer stage. This could be done to ensure that the verification process, that typically requires some minimal amount of padding in the plaintext (e.g. 1 byte), does not need modification. This variation would be most suitable where the symmetric encryption scheme is able to use a plaintext of any byte length and does not make the ciphertext any longer than the plaintext.

Another variation is one where the intermediate plaintexts incorporate portions of the previous signer's "s" components. In this variation, the final signature would have the form $(c_T, s_T)$ and the verifier 14 would recover $c_{T-1}$ and $s_{T-1}$ from $c_T$ and so on. Although this form of semi-aggregate signature has fewer components, it may not necessarily be shorter in length because the ciphertext $c_T$ is an encryption of $c_{T-1}$ and $s_{T-1}$ which itself is an encryption of $c_{T-2}$ and $s_{T-2}$ and so on. It can be expected that the length of $c_T$ be at least the length of H plus the sum of the lengths of $s_1, \ldots, s_T$, which is about the same length as the first form of semi-aggregate signature $(c_T, s_1, \ldots s_T)$.

In another variation, the intermediate plaintexts are the previous "s" values, without including the previous ciphertexts. In this variation, the final signature has the form $(c_1, \ldots, c_T, s_T)$, where a verifier would recover $S_{T-1}$ from $c_T$ and so on. Again, the signature length would be expected to be approximately the same as the first form $(c_1, s_1, \ldots, s_T)$.

Figure 21:
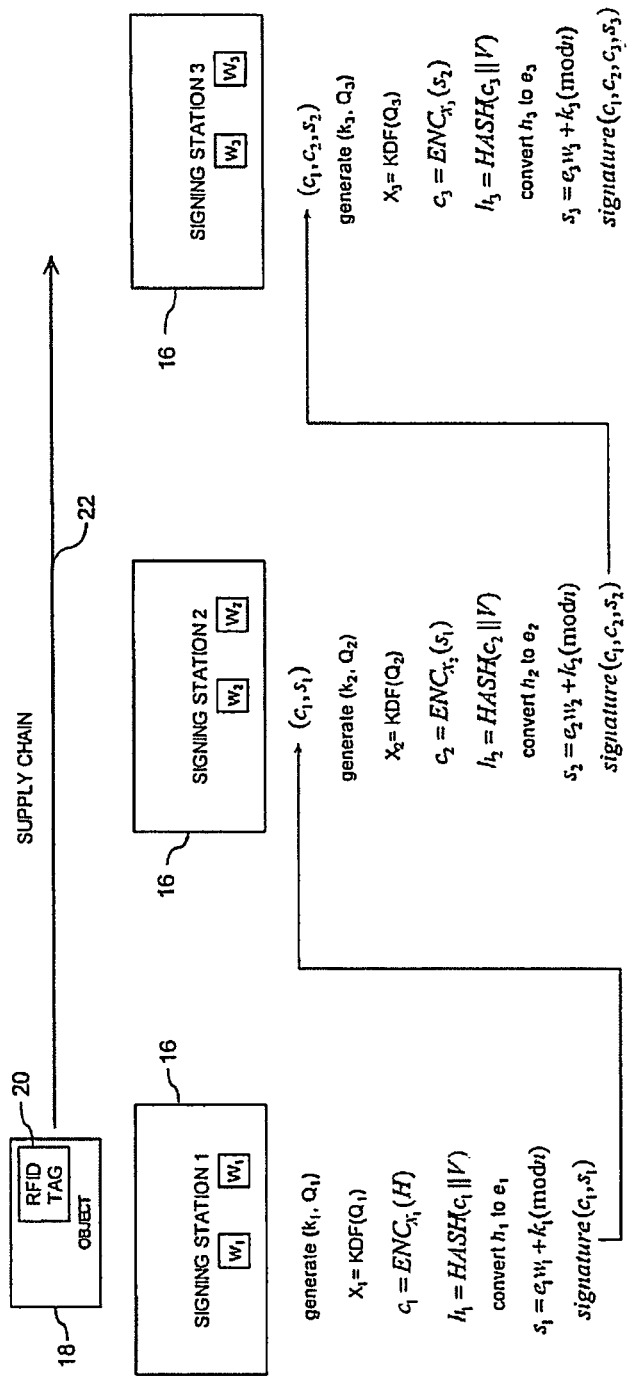
FIG. 21 is a schematic block diagram showing another semi-aggregate signature generation scheme.
Figure 22:
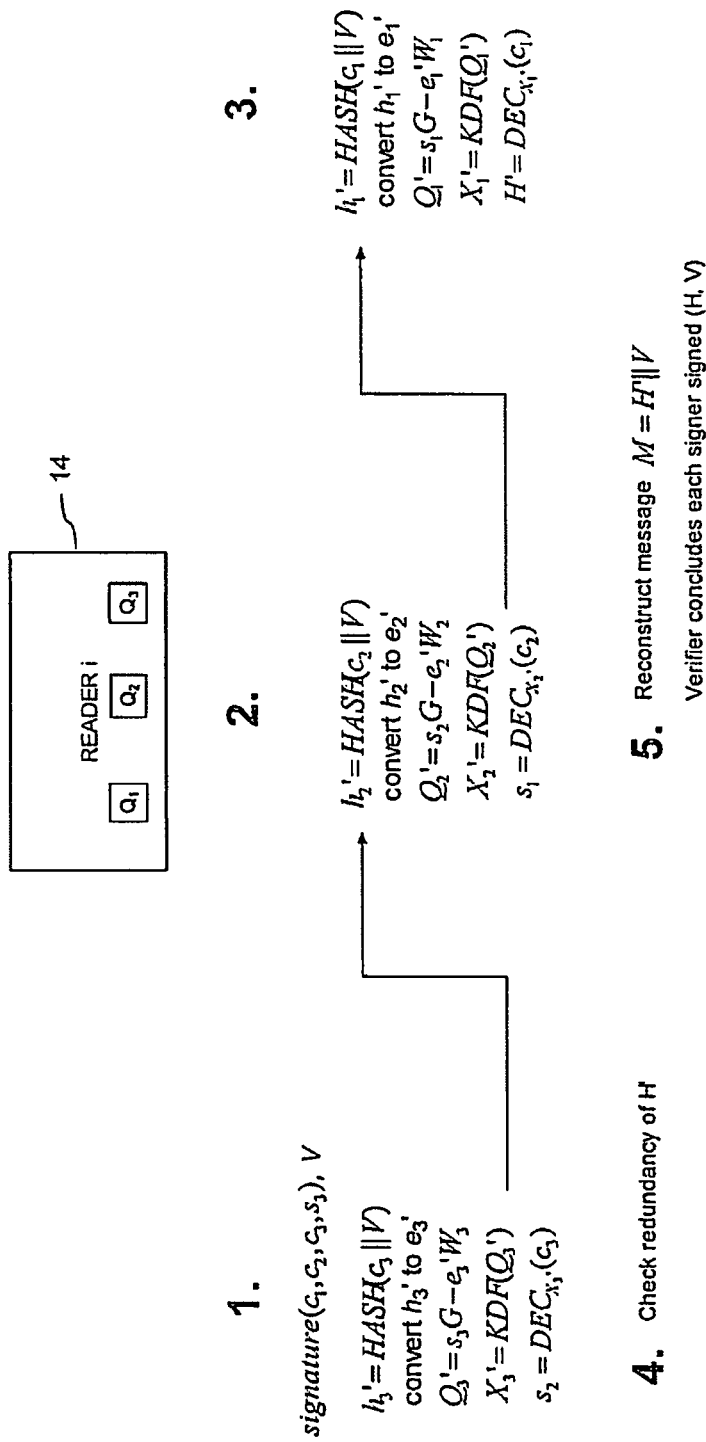
FIG. 22 is a schematic block diagram showing another semi-aggregate signature verification scheme.

To further illustrate this variation on the semi-aggregate signature scheme, the following example is provided for three signers, making reference to FIGS. 21 and 22. The following example is also particularly applicable to a pharmaceutical supply chain having three signing stations 16 in the supply chain 22 that each contribute to the signature added to an RFID tag 20 affixed to an object 18 (see also FIG. 1).

Similar to FIG. 19, as shown in FIG. 21, Signing Station 1 generates an ephemeral key pair $(k_1, Q_1)$ and computes encryption keyed $X_1 = KDF(Q_1)$. A first signature component $c_1$ is then computed using the recoverable part H of the message M, while ensuring sufficient redundancy in H exists for later verification. Using the visible portion V of the message M, an intermediate component $h_1$ is then computed using a hash function (e.g. SHA1), $h_1$ then converted to an integer $e_1$, which is then used along with the private key $w_1$ of Signing Station 1 and the key $k_1$ to generate the second signature component $s_1$. In this example, the signature having components $(c_1, s_1)$ is then written to the RFID tag 20.

As before, Signing Station 2, then contributes to the semi-aggregate signature by generating ephemeral key pair $(k_2, Q_2)$ and computing $X_2 = KDF(Q_2)$. However, in this variation, Signing Station 2 encrypts existing signature component $s_1$ using $X_2$ to generate signature component $c_2$. Intermediate signature component $h_2$, integer $e_2$, and signature component $s_2$ are computed as usual, however, the resultant updated signature comprises $(c_1, c_2, s_2)$. As such, signature component $s_1$ is encrypted in $c_2$ and the "c" components (i.e. $c_1, c_2$ at this stage) are kept available directly from the signature.

As before, Signing Station 3 then also contributes to the semi-aggregate signature, by creating a resultant updated signature $(c_1, c_2, c_3, s_3)$ as shown in FIG. 21. It can be seen that, similar to the above, Signing Station 3 updates the signature by encrypting the previous "s" component in generating the next "c" component and each "c" component contribution is kept in the signature as it is updated.

Therefore, at each stage in this variation, the new signature that embeds the "s" component of the previous signer 16, is written over the previous form of the semi-aggregate signature. Therefore, the semi-aggregate signature $(c_1, \ldots c_T, s_T)$ is smaller than writing individual signatures $((c_1, s_1), \ldots, (c_T, s_T))$ to the RFID tag 20.

Referring now to FIG. 22, verification of the semi-aggregate signature includes a stage for each signing stage as before and, in this example, the RFID tag 20 includes a signature having components ($c_1, c_2, c_3, s_3$) and the visible portion V of the message M (e.g. UID).

In stage 1, the verifier 14 computes $h_3'$ using component $c_3$ and the visible portion V, converts $h_3'$ to an integer $e_3'$, computes $Q_3'$ using $s_3$, $e_3'$ and the public key $W_3$ of Signing Station 3, and then generates $X_3'$ by applying the same KDF to $Q_3'$. The verifier 14 then obtains $s_2$ by decrypting $c_3$ using $X_3'$ and a complementary decryption function, e.g. that denoted by "DEC" in FIG. 22.

Now that the verifier has obtained $S_2$, in stage 2, the verifier computes $h_2'$ using component $c_2$ and the visible portion V, converts $h_2'$ to an integer $e_2'$, computes $Q_2'$ using $s_2$, $e_2'$ and the public key $W_2$ of Signing Station 2, and then generates $X_2'$ by applying the same KDF to $Q_2'$. The verifier then obtains s, by decrypting $c_2$ using $X_2'$ and a complementary decryption function.

In stage 3, the verifier computes $h_1'$ using component $c_1$ and the visible portion V, converts $h_1'$ to an integer $e_1'$, computes $Q_1'$ using $s_1$ (which was recovered in stage 2), $e_1'$ and the public key $W_1$ of Signing Station 1, and then generates $X_1'$ by applying the same KDF to $Q_1'$. It can be seen that in this variation, $X_1'$ can only be recovered by having previously recovered $s_1$. Since $c_1$ was, as before, generated by encrypting the recoverable portion of the message H, a bit string H', which is a representation of H is then obtained by decrypting $c_1$ using $X_1'$. At stage 4, the verifier 14 then checks for the expected characteristic such as the redundancy of H' in this example and, if sufficient, accepts H' as the recoverable portion H and can reconstruct the message M, e.g. by combining H' and V at stage 5. The verifier 14 may then conclude that each signer signed the message M.

It may also be possible that the recoverable message part H is not the same for each signer 16. For example, suppose that the recoverable message part is $H_j$ for each signer 16. In a non-aggregated case, there is an ECPVS signature ($c_j, s_j$) for each signer 16 for message $H_j$, and the message $H_j$ is encoded within $c_j$. If the signatures were aggregated, each of the messages would need to be encoded.

The first approach to semi-aggregate signatures can be modified by appending the distinct messages $H_j$ to the intermediate plaintexts. Since the intermediate plaintexts were taken to be the previous intermediate ciphertext, the previous ciphertext can be concatenated (or other method of combining) to the current recoverable message part. A first plaintext $PT_1$ is $H_1$ with any necessary padding to make it sufficiently redundant, and the intermediate plaintexts can be computed as $PT_2 = c_1 \| H_2$ and so on.

For example, Signing Station 3 would generate ephemeral key pair ($k_3, Q_3$) and compute $X_3 = KDF(Q_3)$, compute $c_3 = ENC_{x3}(c_2 \| H_3)$, and then compute $h_3 = HASH(c_3 \| V)$, convert to $e_3$, and compute $s_3 = e_3 w_3 + k_3 \pmod{n}$. The final aggregate signature in this variation has the form ($c_T, s_1, \ldots, s_T$). However, the length of $c_T$ is at least the combined length of the distinct messages $H_1, H_2, \ldots, H_T$, instead of only the length of H. Although the signed message is longer, the message expansion would be the same because component $c_T$ is no longer than the total length of the recoverable message being signed. Alternatively stated, the message expansion mainly occurs due to the "s" components, which is true whether or not there are distinct recoverable portions $H_j$ or a single recoverable portion H.

It will be appreciated that the other variants described above could also be implemented as semi-aggregate signature using distinct recoverable portions $H_j$ as well as distinct visible portions $V_j$.

Semi-Aggregate Signatures used with Implicit Certificates

The semi-aggregate signature methods described above can also be used in conjunction with implicit certificates. For an implicit certificate having correspondents Alice and Bob, Alice receives from Bob or some directory, Bob's implicit certificate $c_B$. From this single point, Alice computes Bob's public key as $B = Hash(c_B, I_B) \div Q_{CA}$, where $I_B$ is a string identifying Bob, a certifying authority (CA), and other pertinent information, such as a validity period, key usage etc.; and $Q_{CA}$ is the public key of the identified CA. Now Alice can use B as the implicitly certified public key of Bob. The implicit nature is due to the fact that Alice can be sure that only Bob knows the private key associated with B, but she cannot be sure that Bob actually knows the private key. However, Alice soon expects Bob to use the private key and, as such, Alice would be able to detect this problem almost as soon as she needs to use B.

For semi-aggregate signatures, if Signer j has implicit certificate $C_{Signer\ j}$, then the verifier 14 computes the public key of Signer j as $Q_{Signer\ j} = Hash(C_{Signer\ j}, I_{Signer\ j}) + Q_{CA\ j}$, where $I_{Signer\ j}$ is the certificate information associated with Signer j and $Q_{CA\ j}$ is the public key of the CA who issued implicit certificate $C_{Signer\ j}$.

For example, when the verifier 14 is recovering the plaintext that, say, Signing Station 2 signed using ECPVS, then the verifier 14 normally computes $h_2' = HASH(c_2 \| V)$, converts to integer $e_2'$, and from that computes $Q_2' = s_2 G - e_2' W$ and finally $X_2 = KDF(Q_2')$. Where there is implicit certificate $C_2$, the computations may instead be performed as: $h_2' = HASH(c_2 \| V) HASH(C_2 \| I_2) \bmod n$ and $X_2 = s_2 G + e_2' C_2 + Hash(c_2 \| V) Q_{CA2}$ respectively.

Known methods such as Shamir's trick and Solinas' "Joint Sparse Form" etc. allow an increase in the speed of the single computation of $X_2$, compared to computing $Q_2$ first from $C_2$, and then $X_2$ with the former equation. It will be appreciated that if an explicit certificate has been used, the verifier 14 would need to verify an explicit signature of the CA computed upon public key $Q_2$, which would have taken longer.

It can therefore be seen that several variations of semi-aggregate ECPVS signatures can be used. For pharmaceutical supply chains 22 exemplified above, manufacturers, wholesalers, distributors and shippers may each add their own ECPVS to an RFID tag 20 attached to a package 18. Because the space available for data on an RFID tag 20 is limited, semi-aggregate signatures are advantageous in such an application by allowing more signatures to be fit into the same limited space. When the package 18 arrives at a pharmacy, the aggregate signature can be verified so that the pharmacy can conclude that the delivery was handled by authorized parties during the entire course of the supply chain 22. It will be appreciated that the above principles equally apply to other systems and should not be limited to pharmaceutical environments or limited to use in authenticated RFID systems.

Fully-Aggregate ECPVS Signatures

In certain scenarios, where the co-operation of multiple signers can be achieved, a fully-aggregate ECPVS signature scheme can be used. In the following scheme, T signers cooperate to aggregate what would normally be T distinct ECPVS signatures into what is effectively a single ECPVS signature of all T signers.

In general, where Signing Station j has private key $w_j$ and public key $W_j$, Signing Station j generates ephemeral key pair ($k_j, Q_j$) and then encryption key $X_j = KDF(Q_j)$ as done in traditional ECPVS and explained in detail above. An aggregate encryption key is then computed as $X = X_1 + X_2 + \ldots + X_T$.

As per the description above, the recoverable part H of message M is encrypted using the encryption key, in this case, the aggregate encryption key X to obtain a ciphertext $c=ENC_X$ (H). If the recoverable pat varies, then H is replaced by $H_j$ and c is replaced by $c_j$.

An intermediate component h=HASH(c||V) may then be computed from c, the intermediate component h converted to an integer e, and each Signing Station j then computes an "s" component, e.g. as: $s_j=ew_j+k_j \pmod{n}$.

An aggregates value is then computed as $s=s_1+\ldots+s_T$ and the aggregate signature is (c, s) where c encrypts H. If there are distinct recoverable message portions $H_j$, the aggregate signature would appear similar to the semi-aggregate signature, namely as $(c_1, \ldots c_T, s_T)$. The latter aggregate signature is not as fully aggregate as the former signature since each ciphertext $c_j$ may contribute some message expansion to provide redundancy, whereas in full aggregation, message expansion does not grow as the number of signers grows.

To overcome this, it may be noted that the typical way to pad a recoverable message $H_j$ for use in ECPVS is to prepend the message $H_j$ with a sufficiently long string S so that $H_j'=S_j \| H_j$. If the signers all use the same $S_j$ so that $S_j=S$, then it may be the case that $c_j=ENC_X(H_j)=ENC_X(S\|H_j)=c\|c_j'$ for some fixed signer-common string c and a signer-specific string $c_j'$. If the symmetric encryption has the properties of a stream cipher, this may be likely. For symmetric encryption schemes such as AES in CBC mode, this will be true provided that S has a certain length that matches the block size of AES (which is typically 128 bits or 16 bytes). In this case, the aggregate signature may be represented more compactly as $(c, c_1', \ldots, c_r', s)$, and the only message expansion is (c,s), which, being the size of a single signed message, makes the approach fully aggregate.

It should be noted that when a stream cipher is used, wherever the messages have common parts, the ciphertexts also have common parts and, therefore, the common ciphertext portions may be sent just once to further reduce message expansion. As such, the commonality of the ciphertext portions can be exploited no matter where the commonality occurs, even if it is not at the beginning of the message. For messages with certain fixed formatting, this may occur, as well as for block ciphers applied in CTR mode (e.g. like a stream cipher) or in ECB mode (in 64 or 128 bit chunks).

Where there is a single visible portion V, for verification, the intermediate component can be computed as h'=HASH (C||V), h' converted to integer e' as before, the ephemeral public key Q' computed as $Q'=sG-e'(W_1+\ldots+W_T)$, and from that the decryption key computed as X=KDF(Q'). It should be noted however that where there are distinct visible portions $V_j$, each intermediate component is computed as $h_j'$=HASH $(c\|V_j)$ and the ephemeral public key Q' computed as $Q'=sG-(e_1'W_1+\ldots+e_T'W_T)$. It should also be noted that if the recoverable portion H varies by signer 16, each occurrence of c is replaced by $c_j$.

Not only is the computation $Q'=sG-e'(W_1+\ldots+W_T)$ generally more efficiently computable, it will indicate that (c,s) is a valid ECPVS signature for public key $W_1+W_2+\ldots+W_T$.

The verifier 14 may then obtain the plaintext H' by decrypting c using the decryption key X, which can be derived from the ephemeral key Q' using the same KDF. If H' has the necessary redundancy, then the message M can be reconstructed by, e.g. concatenating H' and V and the verifier 14 can then conclude that each signer signed the message.

Figure 24:
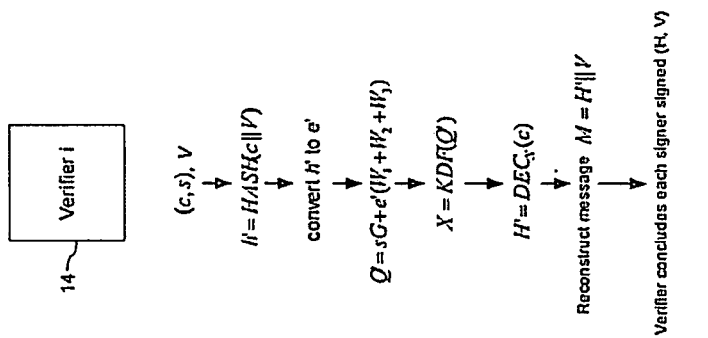
FIG. 24 is a schematic block diagram showing a fully aggregate signature verification scheme.
Figure 23:
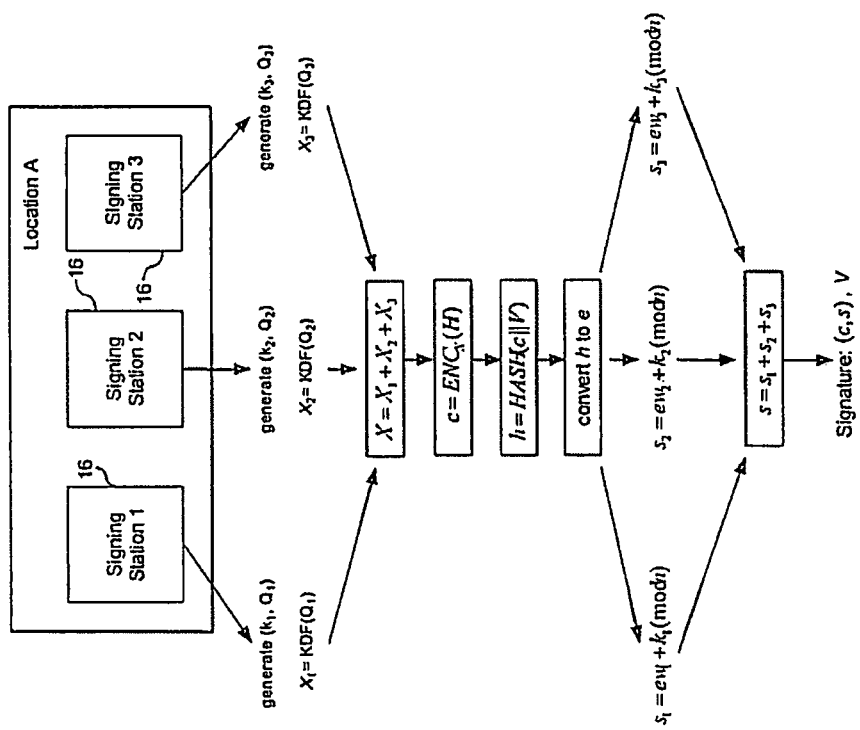
FIG. 23 is a schematic block diagram showing a fully aggregate signature generation scheme.

Referring to FIGS. 23 and 24, an example with Signing Stations 1 through 3 is illustrated. It can be seen in FIG. 23 that each signer 16 contributes a component in computing X and each signer 16 uses the intermediate component h' to compute an "s" component that is contributed to the aggregate s used in the signature.

It can also be seen in FIG. 24 that the ephemeral public key is reconstructed using a combination of the public keys of the signers and a representation H' of the recoverable portion H is decrypted from c using the public key.

In the case where each signer 16 uses a distinct recoverable portions $H_j$, the step of recovering $H_j'$ is replaced with $H_j'=DEC_X(c_j)$.

It should be noted that the fully aggregated method requires the active participation of each signer 16. If a new signer 16 is to be added to the aggregate, then the previous signers will need to contribute new contributions $s_j$ to the signature component s. This may be disadvantageous when compared to semi-aggregate ECPVS, where any new signer could add in an extra signature. As such, these considerations can be used to determine whether semi-aggregate or fully-aggregate signature are more appropriate for a given application.

For security reasons, it is preferable in aggregate ECPVS that signer j who obtains certificates for $Q_{Signer\,j}$, provides a proof-of-possession (POP) of the private key to some CA (or failing that, to the verifier). Typically, POP for signing public keys is done by signing a certificate request sent to the CA. Verifiers can usually rely on a CA to obtain POP from the subject of each certificate as it issues.

Also, fully aggregated ECPVS signatures can work in conjunction with implicit certificates. For example, if Signer j has implicit certificate $C_{Signer\,j}$, then the verifier 14 can compute the public key of Signer j as $W_j$=Hash($C_{Signer\,j}$, $I_{Signer\,j}$) $C_{Signer\,j}+Q_{CA\,j}$, where $I_{Signer\,j}$ is the certificate information associated with Signer j and $Q_{CA\,j}$ is the public key of the CA who issued implicit certificate $C_{Signer\,j}$. As with semi-aggregate signatures, the computation of $Q_j$ can be substituted into the equations for computing X, which may offer better performance rather than computing $Q_j$ first and then X.

Other Signature Schemes

Other ElGamal type signatures can use the principles above with respect to ECPVS to apply the semi-aggregate and fully aggregate methods described above. Other signature schemes, such as ECDSA, have features that are sufficiently different warranting additional consideration.

Aggregating ECDSA Signatures

Figure 26:
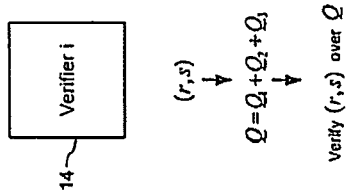
FIG. 26 is a schematic block diagram showing yet another aggregate signature verification scheme.
Figure 25:
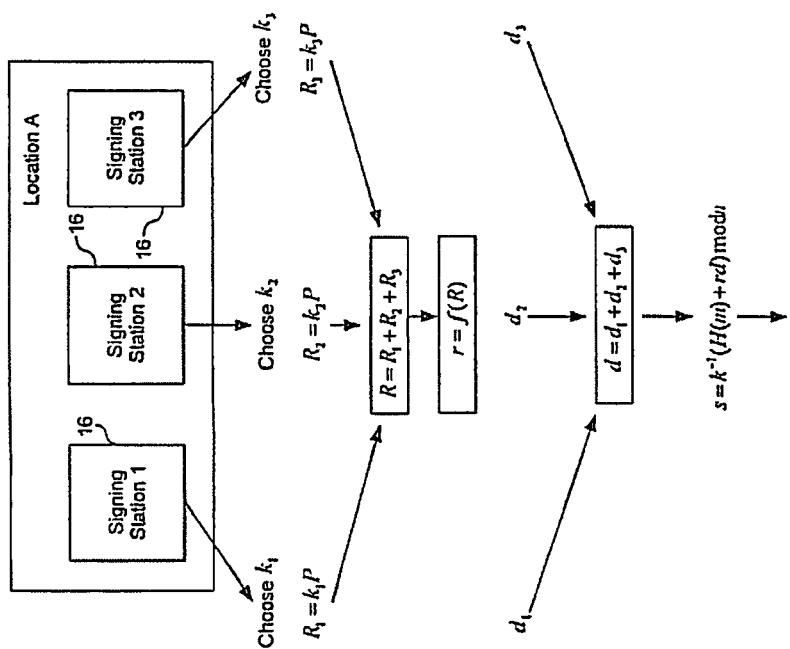
FIG. 25 is a schematic block diagram showing yet another aggregate signature generation scheme.

It may also be desirable to aggregate ECDSA signatures, for example in a pharmaceutical supply chain 22 where ECDSA is used for signing the RFID tags 20. Such an embodiment is shown in FIGS. 25 and 26.

Similar to the above, it is considered how T signers can cooperate to produce a fully aggregate signature that is valid if and only if the corresponding T ECDSA signatures would have been valid. Reference is made to the above-description of ECDSA.

Each signer chooses a random value $k_j$ and computes a value $R_j=k_jP$, which is sent to the other signers. The common value of R is computed as $R=R_1+\ldots+R_T$. The corresponding k such that R=kP would thus be $k=k_1+\ldots+k_T$. None of the individual signers knows the value k since signer j only knows its contribution $k_j$ to the common key k. Similarly, $d=d_1+\ldots+d_T$ represents a common private key of the signers, where none of the individual signers knows the whole value of d. The corresponding public key would thus be computed as the sum of the individual signers' public keys where $W=dP=d_1P+\ldots+d_TP=W_1+\ldots+W_T$.

The first signature component r is computed as r=$f$(R), where $f$( ) is the function that is normally used in the particular implementation of ECDSA to convert the x-coordinate of a point to an integer, and reduces the integer modulo n (also see above definition of ECDSA).

Finally, the second signature component s can then be computed as $s=k^{-1}(H(m)+rd)$ mod n and the signature can be computed as (r,s), which will be a valid ECDSA signature on message M tinder common public key $W=W_1+\ldots+W_T$.

Verifying the aggregated ECDSA signature can be done by the verifier 14 first computing the common public key $W=W_1+\ldots+W_T$, where $W_j$ is the public key of Signing Station j; and then verifying (r,s) (e.g. by reading RFID tag 20) under common public key W.

The value s is computed from d and k, which are secret values that no individual signer 16 shown know as a whole. Similarly, no signer 16 should know any other signer's private keys. To preserve this level of security, the signers 16 can use one of the known methods for doing secure multiparty computation, which allows multiple entities to compute a value that is a function of the multiple individually held secrets, without any party revealing anything about it own secrets to the other parties. Known methods for secure multiparty computation are given in Chaum et al., "*Multi-party unconditionally secure protocols*", in Proc. of ACM STOC '88, 1988; and Ben-Or et al., "*Completeness theorems for non-cryptographic fault-tolerant distributed computation*, in Proc. of ACM STOC '88, 1988, pp. 1-10.

It can therefore be seen that multiple signatures from multiple signers can be achieved using less message expansion. Both semi-aggregate and fully-aggregate signature schemes can be used and are particularly adaptable to ECPVS and ECDSA. Multiple signatures are particularly useful in applications where the amount of storage space for such signature is at a premium and multiple signatures enables signatures to be written at various stages in a process, such as an RFID tag 20 in a pharmaceutical supply chain 22.

Although the invention has been described with reference to certain specific embodiments, various modifications thereof will be apparent to those skilled in the art without departing from the spirit and scope of the invention as outlined in the claims appended hereto.

The invention claimed is:

1. A method for managing verification keys for RFID readers, said method comprising:
   receiving, from a signer, a request for a new verification key;
   returning, to said signer, a response associated with the new verification key;
   updating permissions for RFID readers for using said new verification key;
   obtaining the new verification key corresponding to a private key of the signer, said private key being used to generate a signature stored in memory on an RFID tag read by at least one of said RFID readers, said signature comprising: (i) a first signature component generated by encrypting sensitive data comprising a product type using an encryption key, said product type identifying a product to which the RFID tag is attached, said first signature component being stored in a first portion of said memory and hiding said product type from RFID readers not having said new verification key, said sensitive data being recoverable from said first signature component using a decryption key generated using said new verification key; (ii) a second signature component generated using said first signature component, said private key of said signer, and visible data, said second signature component being stored in a second portion of said memory and being used to generate said decryption key, and (iii) said visible data stored in plaintext in a third portion of said memory; and
   distributing said new verification key to an RFID reader using a controlled channel, after determining that said RFID reader has permission to recover said sensitive data from said first signature component when verifying said signature.

2. The method according to claim 1 wherein said distributing is performed periodically for a plurality of RFID readers and a plurality of verification keys such that dedicated connections to said plurality of RFID readers are not required.

3. The method according to claim 1, further comprising receiving a key update request from said RFID reader to determine whether or not said RFID reader has permission to recover said sensitive data.

4. The method according to claim 1, further comprising receiving a registration request from a new RFID reader; and determining whether said new RFID reader has permission to recover said sensitive data.

5. The method according to claim 1, further comprising:
   receiving, from a signing station associated with said signer, a certificate request associated with said new verification key;
   returning, to said signing station, a certificate for said new verification key;
   determining RFID readers that are entitled to said certificate;
   updating said permissions for said RFID readers; and
   storing said certificate for subsequent key updates.

6. The method according to claim 1, further comprising receiving a report indicative of a usage of said verification key by said RFID reader; and associating revenue with said usage.

7. The method according to claim 1, further comprising receiving, from a signing station, a report indicating a number of signatures written on said RFID tags; and associating revenue with said number of signatures.

8. The method according to claim 1, further comprising receiving a subscription payment, and performing said distributing according to said subscription payment.

9. The method according to claim 1, further comprising sending a key pair comprising a private key and a corresponding public key to said RFID reader.

10. The method according to claim 1, wherein said sensitive data corresponds to one of a plurality of product types, said method further comprising determining that said RFID reader has permission to recover said sensitive data for a corresponding product type.

11. A non-transitory computer readable medium comprising computer executable instructions for managing verification keys for RFID readers by:
    receiving, from a signer, a request for a new verification key;
    returning, to said signer, a response associated with the new verification key;
    updating permissions for RFID readers for using said new verification key;
    obtaining the new verification key corresponding to a private key of the signer, said private key being used to generate a signature stored in memory on an RFID tag read by at least one of said RFID readers, said signature comprising: (i) a first signature component generated by encrypting sensitive data comprising a product type using an encryption key, said product type identifying a product to which the RFID tag is attached, said first signature component being stored in a first portion of said memory and hiding said product type from RFID readers not having said new verification key, said sensitive data being recoverable from said first signature component using a decryption key generated using said new verification key; (ii) a second signature component generated using said first signature component, said private key of said signer, and visible data, said second signature component being stored in a second portion of said memory and being used to generate said decryption key, and (iii) said visible data stored in plaintext in a third portion of said memory; and distributing said new verification key to an RFID reader using a controlled channel, after determining that said RFID reader has permission to recover said sensitive data from said first signature component when verifying said signature.

12. The non-transitory computer readable medium according to claim 11, further comprising instructions for receiving a registration request from a new RFID reader;
and determining whether said new RFID reader has permission to recover said sensitive data.

13. The non-transitory computer readable medium according to claim 11, further comprising instructions for:
receiving, from a signing station, a certificate request associated with said new verification key;
returning, to said signing station associated with said signer, a certificate for said new verification key;
determining RFID readers that are entitled to said certificate;
updating said permissions for said RFID readers; and
storing said certificate for subsequent key updates.

14. The non-transitory computer readable medium according to claim 11, further comprising instructions for receiving a report indicative of a usage of said verification key by said RFID reader; and associating revenue with said usage.

15. The non-transitory computer readable medium according to claim 11, further comprising instructions for receiving, from a signing station, a report indicating a number of signatures written on said RFID tags; and associating revenue with said number of signatures.

16. The non-transitory computer readable medium according to claim 11, further comprising instructions for receiving a subscription payment, and performing said distributing according to said subscription payment.

17. The non-transitory computer readable medium according to claim 11, further comprising instructions for sending a key pair comprising a private key and a corresponding public key to said RFID reader.

18. The non-transitory computer readable medium according to claim 11, wherein said sensitive data corresponds to one of a plurality of product types, said method further comprising determining that said RFID reader has permission to recover said sensitive data for a corresponding product type.

19. A key management system for managing verification keys for RFID readers, said key management system being configured for:
receiving, from a signer, a request for a new verification key;
returning, to said signer, a response associated with the new verification key;
updating permissions for RFID readers for using said new verification key;
obtaining the new verification key corresponding to a private key of the signer, said private key being used to generate a signature stored in memory on an RFID tag read by at least one of said RFID readers, said signature comprising: (i) a first signature component generated by encrypting sensitive data comprising a product type using an encryption key, said product type identifying a product to which the RFID tag is attached, said first signature component being stored in a first portion of said memory and hiding said product type from RFID readers not having said new verification key, said sensitive data being recoverable from said first signature component using a decryption key generated using said new verification key; (ii) a second signature component generated using said first signature component, said private key of said signer, and visible data, said second signature component being stored in a second portion of said memory and being used to generate said decryption key, and (iii) said visible data stored in plaintext in a third portion of said memory; and distributing said new verification key to an RFID reader using a controlled channel, after determining that said RFID reader has permission to recover said sensitive data from said first signature component when verifying said signature.

20. The key management system according to claim 19, further comprising:
a certificate agent for issuing certificates for a plurality of verification keys;
a certificate server; and
a conditional access database for storing certificates associated with said plurality of verification keys.

21. The key management system according to claim 19, further comprising at least one controller for monitoring signing of RFID tags by one or more signing stations, and for monitoring verification of RFID tags using verification keys distributed to a plurality of RFID readers.

22. The key management system according to claim 19, wherein said distributing is performed periodically for a plurality of RFID readers and a plurality of verification keys such that dedicated connections to said plurality of RFID readers are not required.

23. The key management system according to claim 19, further configured for receiving a key update request from said RFID reader to determine whether or not said RFID reader has permission to recover said sensitive data.

24. The key management system according to claim 19, further configured for receiving a registration request from a new RFID reader; and determining whether said new RFID reader has permission to recover said sensitive data.

25. The key management system according to claim 19, further configured for:
receiving, from a signing station, a certificate request associated with said new verification key;
returning, to said signing station associated with said signer, a certificate for said new verification key;
determining RFID readers that are entitled to said certificate;
updating said permissions for said RFID readers; and
storing said certificate for subsequent key updates.

26. The key management system according to claim 19, further configured for receiving a report indicative of a usage of said verification key by said RFID reader; and associating revenue with said usage.

27. The key management system according to claim 19, further configured for receiving, from a signing station, a report indicating a number of signatures written to corresponding RFID tags; and associating revenue with said number of signatures.

28. The key management system according to claim 19, further configured for receiving a subscription payment, and performing said distributing according to said subscription payment.

29. The key management system according to claim 19, further configured for sending a key pair comprising a private key and a corresponding public key to said RFID reader.

30. The key management system according to claim 19, wherein said sensitive data corresponds to one of a plurality of product types, said method further comprising determining that said RFID reader has permission to recover said sensitive data for a corresponding product type.

* * * * *